(12) United States Patent
Coleman et al.

(10) Patent No.: US 10,310,062 B2
(45) Date of Patent: Jun. 4, 2019

(54) FREQUENCY STEERED SONAR HARDWARE

(71) Applicant: Garmin Switzerland GmbH, Schaffhausen (CH)

(72) Inventors: Aaron R. Coleman, Broken Arrow, OK (US); Brian T. Maguire, Bixby, OK (US); Brandon M. Black, Broken Arrow, OK (US); Jeffrey B. Wigh, Olathe, KS (US)

(73) Assignee: Garmin Switzerland GmbH (CH)

( * ) Notice: Subject to any disclaimer, the term of this patent is extended or adjusted under 35 U.S.C. 154(b) by 243 days.

(21) Appl. No.: 15/280,786

(22) Filed: Sep. 29, 2016

(65) Prior Publication Data

US 2018/0217244 A1     Aug. 2, 2018

Related U.S. Application Data

(60) Provisional application No. 62/286,814, filed on Jan. 25, 2016, provisional application No. 62/290,316, filed on Feb. 2, 2016.

(51) Int. Cl.
*G10K 11/32*     (2006.01)
*G01S 7/524*     (2006.01)
(Continued)

(52) U.S. Cl.
CPC .............. *G01S 7/524* (2013.01); *G01S 7/521* (2013.01); *G01S 7/523* (2013.01); *G01S 7/60* (2013.01);
(Continued)

(58) Field of Classification Search
CPC ................................................. G01N 29/221
See application file for complete search history.

(56) References Cited

U.S. PATENT DOCUMENTS

| | | | | | |
|---|---|---|---|---|---|
| 3,283,264 | A | * | 11/1966 | Papadakis | E04H 12/28 310/322 |
| 4,011,747 | A | * | 3/1977 | Shaw | G10K 11/32 310/313 R |

(Continued)

OTHER PUBLICATIONS

Printout from http://www.ncbi.nlm.nih.gov/pmc/articles/PMC4703966/ ; published prior to Sep. 29, 2016.
(Continued)

*Primary Examiner* — Hovhannes Baghdasaryan
(74) *Attorney, Agent, or Firm* — Samuel M. Korte; Max M. Ali

(57) ABSTRACT

A frequency steered sonar element comprises a transducer element and a grating element. The transducer element presents a longitudinal axis and is configured to receive a transmit electronic signal and generate an acoustic wave with a frequency component corresponding to a frequency component of the transmit electronic signal. The grating element presents a longitudinal axis and is oriented such that a longitudinal axis of the grating element and a longitudinal axis of the transducer element form an acute angle. The grating element includes a first surface and an opposing second surface. One or more of the surfaces includes one or more grooves distributed thereon, the one or more grooves including first and second facets. The grating element is configured to emit a sonar beam in an angular direction which varies according to the frequency component of the acoustic wave.

26 Claims, 14 Drawing Sheets

(51) Int. Cl.
   G01S 7/62     (2006.01)
   G01S 7/60     (2006.01)
   G01S 15/89    (2006.01)
   G01S 15/96    (2006.01)
   G01S 7/521    (2006.01)
   G01S 7/523    (2006.01)
   G01S 15/10    (2006.01)
   G01S 15/42    (2006.01)
   G10K 11/34    (2006.01)
(52) U.S. Cl.
   CPC ............ G01S 7/629 (2013.01); G01S 7/6263 (2013.01); G01S 7/6272 (2013.01); G01S 7/6281 (2013.01); G01S 15/10 (2013.01); G01S 15/42 (2013.01); G01S 15/89 (2013.01); G01S 15/96 (2013.01); G10K 11/341 (2013.01)

(56) References Cited

U.S. PATENT DOCUMENTS

| | | | |
|---|---|---|---|
| 4,329,876 A * | 5/1982 | Chen | .................... G01N 29/221 367/103 |
| 5,923,617 A * | 7/1999 | Thompson | .............. G01S 7/534 367/103 |
| 7,542,376 B1 | 6/2009 | Thompson | |
| 7,606,114 B2 | 10/2009 | Bachelor | |
| 7,889,600 B2 | 2/2011 | Thompson | |
| 8,811,120 B2 | 8/2014 | Bachelor | |
| RE45,379 E | 2/2015 | Rowe | |
| 8,964,507 B2 | 2/2015 | Bachelor | |
| 2005/0007882 A1 * | 1/2005 | Bachelor | ................. G01S 15/89 367/103 |
| 2016/0018514 A1 | 1/2016 | Black et al. | |
| 2016/0018516 A1 | 1/2016 | Brown et al. | |
| 2016/0047906 A1 | 2/2016 | Matson et al. | |
| 2016/0049143 A1 | 2/2016 | Matson et al. | |
| 2017/0212230 A1 | 7/2017 | Wigh et al. | |
| 2018/0100922 A1 | 4/2018 | Wigh et al. | |

OTHER PUBLICATIONS

Printout from http://www.bbcboards.net/showthread.php?t=700823 published prior to Sep. 29, 2016.
Printout from https://buv.garmin.com/en-US/US/p/149168 published prior to Sep. 29, 2016.

* cited by examiner

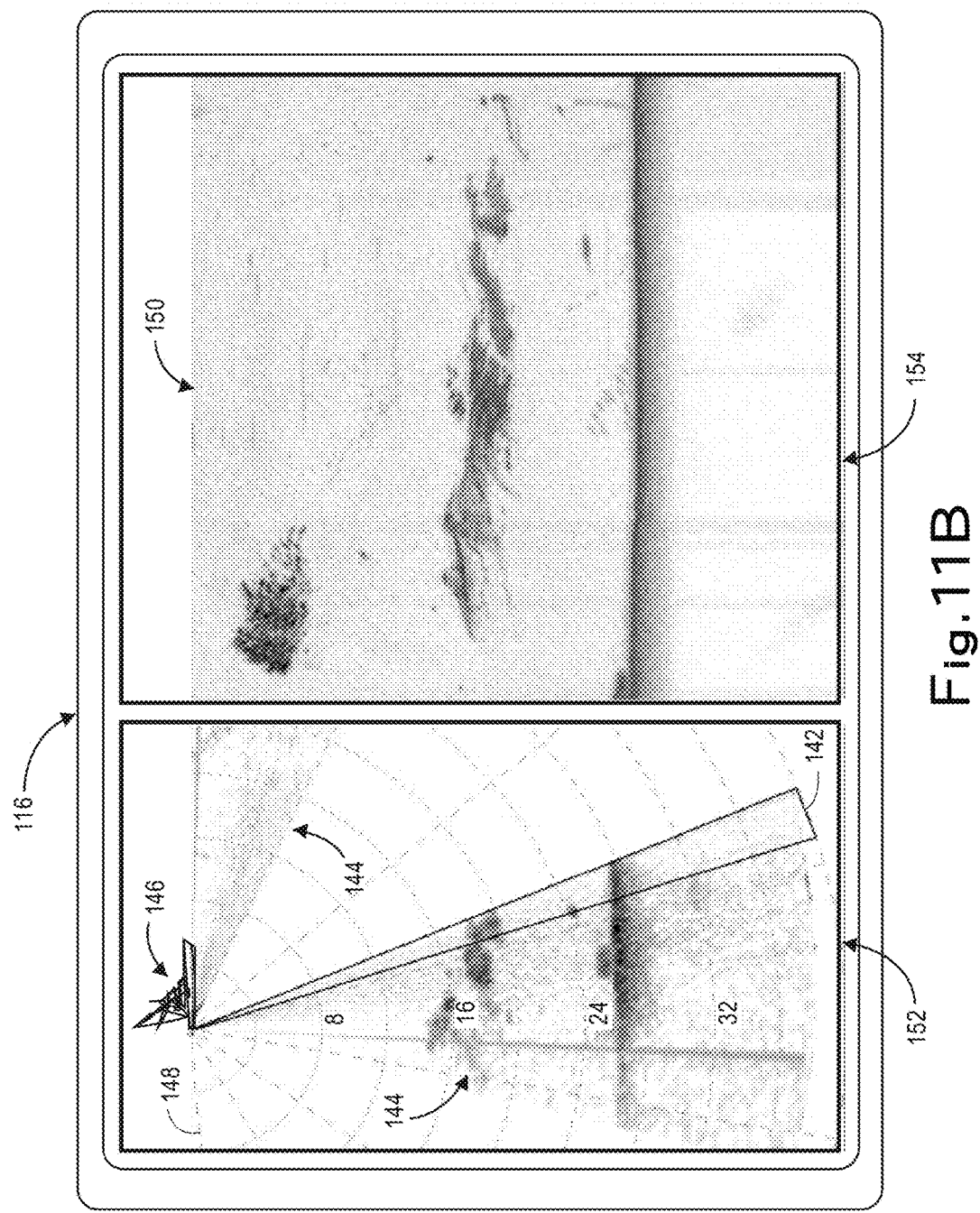

FREQUENCY STEERED SONAR HARDWARE

RELATED APPLICATIONS

The current non-provisional patent application claims priority benefit, with regard to all common subject matter, of U.S. Provisional Application No. 62/286,814, titled "FREQUENCY STEERED SONAR SYSTEM", and filed Jan. 25, 2016, and U.S. Provisional Application No. 62/290,316, titled "FREQUENCY STEERED SONAR SYSTEM WITH DIFFRACTION GRATING", and filed Feb. 2, 2016. The listed, earlier-filed provisional applications are hereby incorporated by reference in their entireties into the current application.

BACKGROUND

Frequency steered marine sound navigation and ranging (sonar) systems can be used to generate real-time sonar imagery. Traditional frequency steered sonar systems use complex and/or expensive arrays of sonar elements to transmit a sonar beam in an angular direction that varies according to a frequency component of the sonar beam. These complex and expensive arrays are often comprised of a plurality of small and delicate piezoelectric elements that can be difficult and cumbersome to manufacture.

SUMMARY

Embodiments of the present technology provide a frequency steered sonar element configured to transmit a sonar beam in an angular direction which varies according to a frequency component of the sonar beam. An embodiment of the frequency steered sonar element broadly comprises a transducer element and a grating element. The transducer element presents a longitudinal axis and is configured to receive a transmit electronic signal and generate an acoustic wave with a frequency component corresponding to a frequency component of the transmit electronic signal. The grating element presents a longitudinal axis and is oriented such that a longitudinal axis of the grating element and a longitudinal axis of the transducer element form an acute angle. The grating element includes a first surface and an opposing second surface. One or more of the surfaces include one or more grooves distributed thereon, the one or more grooves including first and second facets. The grating element is configured to emit a sonar beam in an angular direction which varies according to the frequency component of the acoustic wave.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIGS. 11A and 11B are screen captures taken from the display of the marine sonar display device presenting near real time sonar wedge images in a first window and a historical sonar image in a second window with the historical sonar image of FIG. 11A scrolling left to create the historical sonar image of FIG. 11B;

Figure 17:
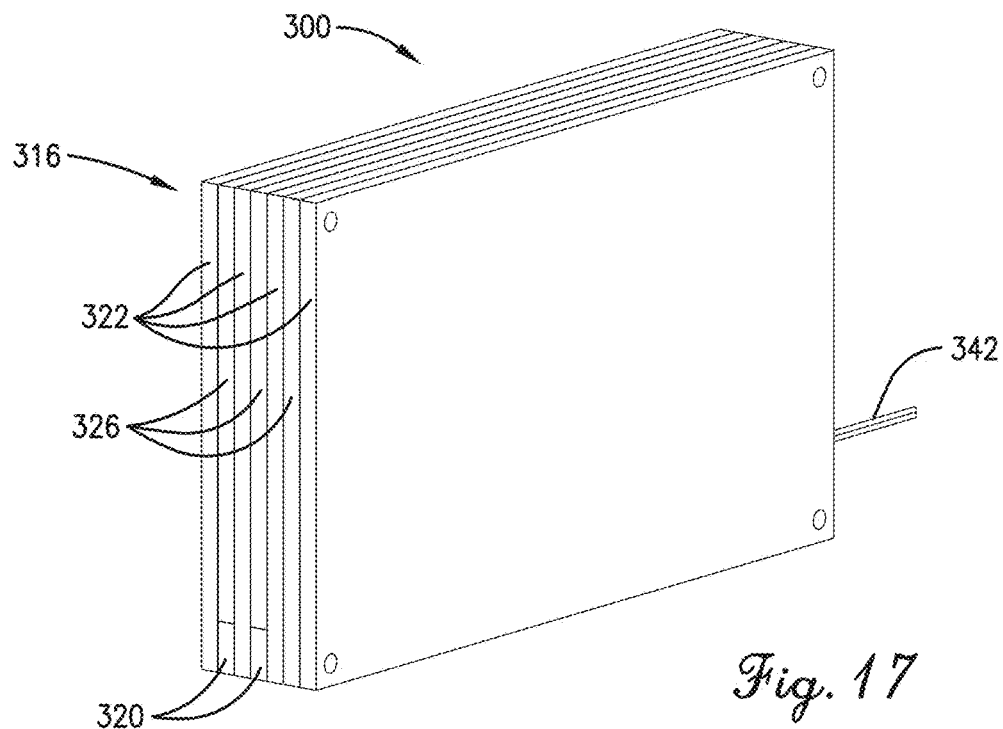
FIG. 17 is an upper perspective view of a third embodiment of the frequency steered sonar element including a housing with a plurality of spaced apart walls with filler material placed between each adjacent pair of walls.
Figure 18:
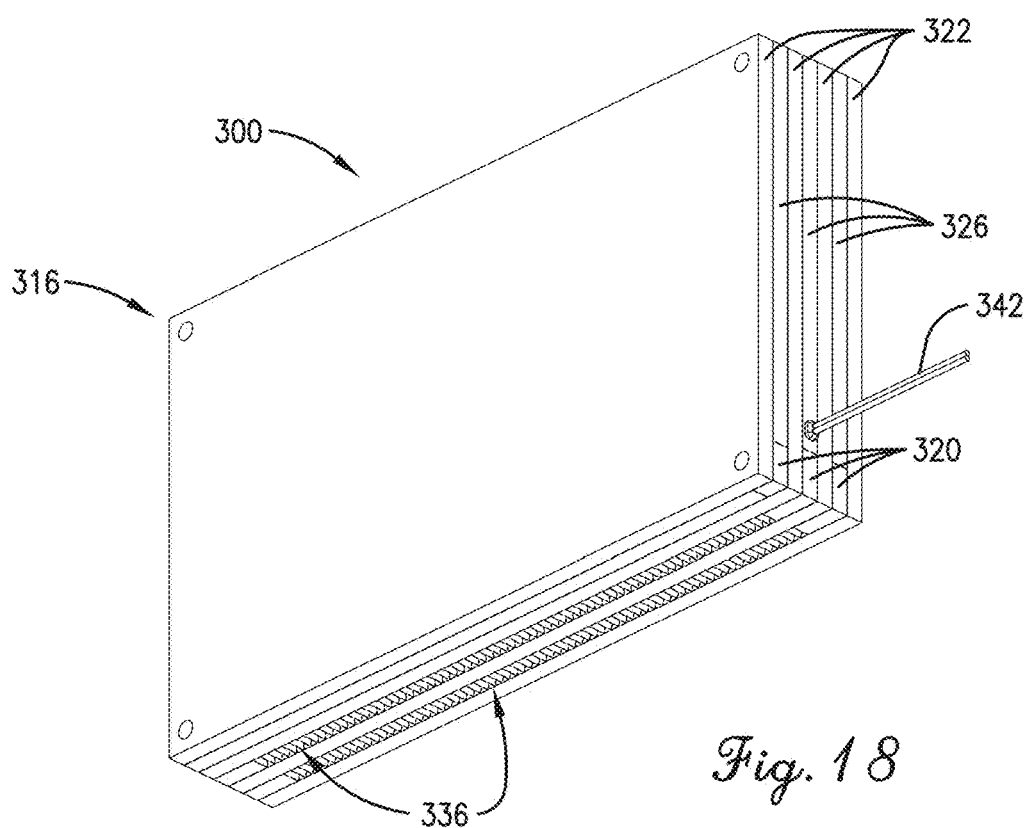
FIG. 18 is a lower perspective view of the frequency steered sonar element of FIG. 17, the frequency steered sonar element including a plurality of grating elements, each grating element positioned between adjacent pairs of walls.
Figure 19:
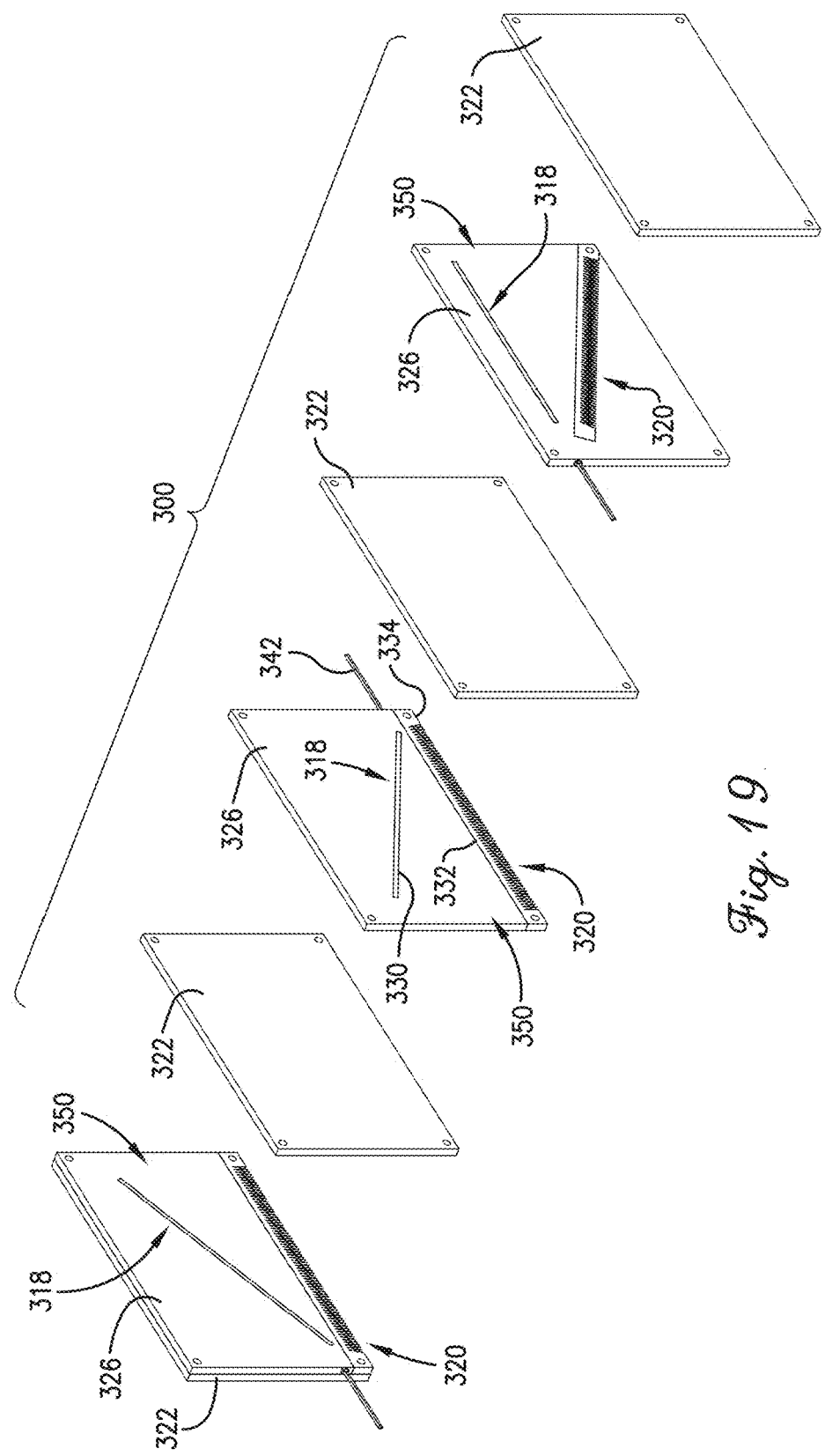
Figure 20:
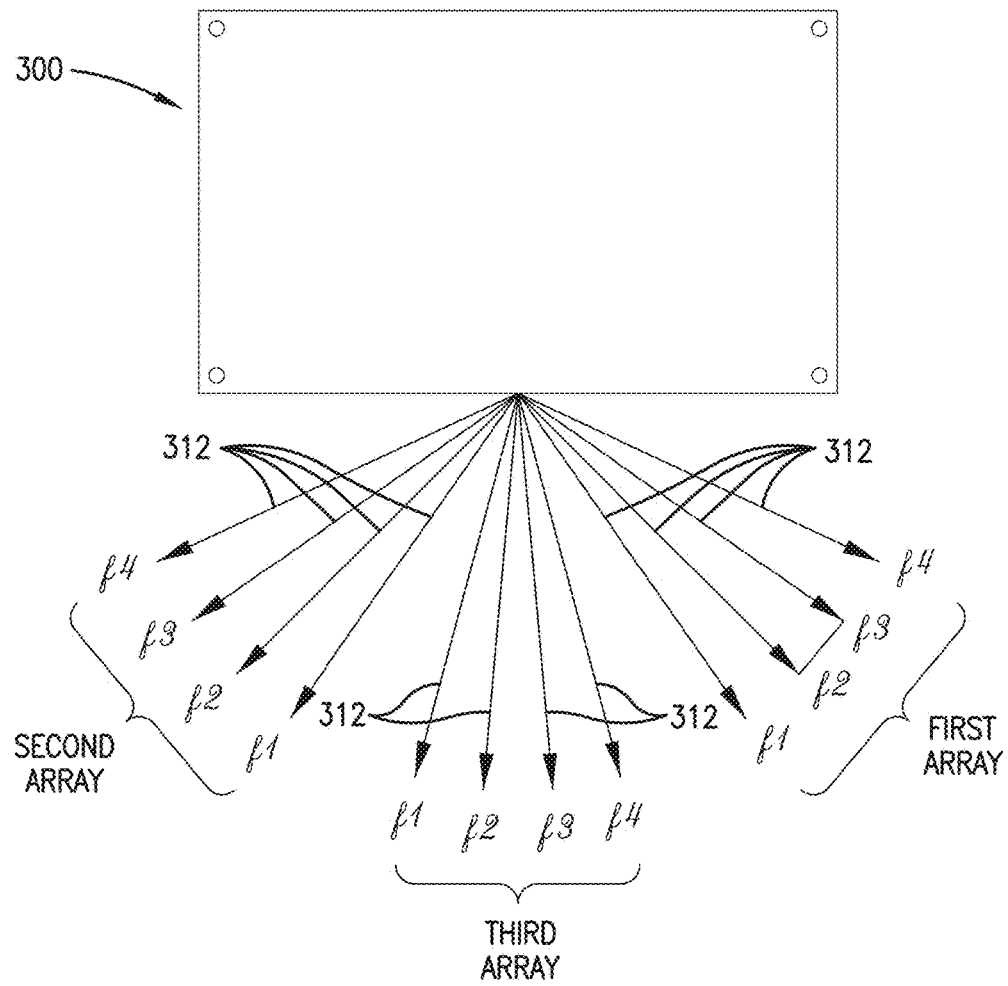

FIG. 19 is an exploded perspective view of the frequency steered sonar element of FIG. 17, the frequency steered sonar element including a plurality of sonar beam formers, each sonar beam former including a transducer element and a grating element, the sonar beam former being positioned between adjacent pairs of walls; and FIG. 20 is a top view of the frequency steered sonar element of FIG. 17, illustrating the sonar element transmitting a plurality of arrays of sonar beams, each sonar beam being transmitted in an angular direction which varies according to a frequency component of the sonar beam and an orientation of the sonar beam former transmitting the sonar beam.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a frequency steered sound navigation and ranging (sonar) element. The frequency steered sonar element may be used in air, water, tissue, or other mediums. The frequency steered sonar element may function as discussed above, wherein the sonar element transmits a sonar beam into a body of water in an angular direction which varies according to a frequency component of the sonar beam and, in turn, a frequency component of a transmit electronic signal. The frequency steered sonar element may also generate a receive electronic signal resulting from receiving reflections of the sonar beam, wherein a frequency component of the receive electronic signal may indicate the angular direction from which reflections of the sonar beam were received. The transmit electronic signals may be received from, and the receive electronic signals may be sent to, an external electronic device, such as a marine sonar display device. The marine sonar display device generally converts the receive electronic signals into sonar data from which sonar images are generated and shown on a display.

Typically, frequency steered sonar elements include a plurality of transducer elements positioned to form a linear array. The array may be subdivided into a plurality of groups, with like numbered members of each group being electrically connected to one another. For example, an array of sixteen transducer elements may include four groups, each with four adjacent transducer elements, wherein the first transducer elements of each group are electrically connected, the second transducer elements of each group are electrically connected, and so forth. During operation, the frequency steered sonar element utilizes beamforming techniques to transmit a sonar beam, wherein a transmit electronic signal is progressively phase delayed for each transducer element that is in a group. Continuing the example from above, the first transducer element in each group receives the transmit electronic signal with no phase delay, the second transducer element in each group receives the transmit electronic signal with one phase delay, the third transducer element in each group receives the transmit electronic signal with two phase delays, and so on, wherein the phase delay is an angular value in units of degrees or radians. In order to transmit the sonar beam in different angular directions, the frequency of the transmit electronic signal is varied.

Receiving reflections and generating the receive electronic signal works in a similar fashion. Continuing the example from above, four receive electronic signals are generated from the frequency steered sonar element. When the receive electronic signals are analyzed by the marine sonar display device, phase delay must be added to the signals, wherein no phase delay is added to the receive electronic signal from the first transducer element in each group, one phase delay is added to the receive electronic signal from the second transducer element in each group, two phase delays is added to the receive electronic signal from the third transducer element in each group, and so forth.

There are both signal processing and component manufacturing drawbacks to this design. Additional signal processing must be performed by the marine sonar display device, as multiple transmit electronic signals are created and sent to the frequency steered sonar element for each sonar beam to be generated. Typically, one transmit electronic signal is created for each transducer element in a group, wherein the first transmit electronic signal has no phase delay and the other signals have a successively increasing phase delay. Likewise, the frequency steered sonar element generates multiple receive electronic signals, one for each transducer element in a group, which are processed by the marine sonar display device. The signal processing may include adding phase delay to the signals, as described above.

The transducer element array is typically formed by dicing, or cutting into small pieces, piezoelectric material. Cutting the material into appropriately sized pieces may be a costly process, with the potential of suffering from yield issues. Furthermore, the transducer elements have to be electrically connected in a specific pattern. The connection scheme is likely best implemented by mounting the transducer elements on a printed circuit board or flexible circuit material, which further drives up costs and manufacturing time, and may dictate that the frequency steered sonar element have a certain minimum size.

Embodiments of the present technology provide an improved frequency steered sonar element. The frequency steered sonar element may comprise, inter alia, a single transducer element, which receives a single transmit electronic signal to transmit a sonar beam and generates a single receive electronic signal in response to receiving reflections of the sonar beam. Thus, no additional signal processing is required to create phase delay. And, the transducer element is generally of sufficient size so that dicing is not necessary. The frequency steered sonar element may further comprise a grating element with a plurality of grooves which create beam forming structures. The transducer element may be positioned in proximity to the grating element in a two-wall housing. The transducer element may operate in combination with the grating element to transmit a frequency steerable sonar beam and receive the reflections thereof. Given the simple construction of the frequency steered sonar element, it may be relatively inexpensive to manufacture.

Embodiments of the technology will now be described in more detail with reference to the drawing figures. Referring initially to FIGS. 1-4, a frequency steered sonar element 10 configured to generate a frequency steerable sonar beam 12 is illustrated. The frequency steered sonar element 10 may transmit the sonar beam 12 into a body of water in response to receiving a transmit electronic signal. The frequency steered sonar element 10 may receive reflections of the sonar beam 12 and generate a corresponding receive electronic signal. Referring to FIG. 4, the transmit and receive electronic signals may be communicated to and from a marine sonar display device 100 that may convert the receive electronic signal into sonar data. The marine sonar display device 100 may utilize the sonar data to generate and display sonar imagery.

The marine sonar display device 100 may be described in more detail with reference to FIGS. 5-11. The marine sonar display device 100 broadly comprises a housing 114, a display 116, a user interface 118, a communication element 120, a location determining element 122, a memory element 124, and a processing element 126. An exemplary marine sonar display device 100 may be embodied by a chartplotter. In some embodiments, such as those shown in the figures, the marine sonar display device 100 may include display and sonar signal processing functionality in the same single housing 114, with which the frequency steered sonar element 10 may electronically communicate. In other embodiments not shown in the figures, the marine sonar display device 100 may include, at least, a first housing, which retains sonar display functionality, and a second housing, which retains sonar signal processing functionality. The frequency steered sonar element 10 may electronically communicate with the second housing.

Figure 5:
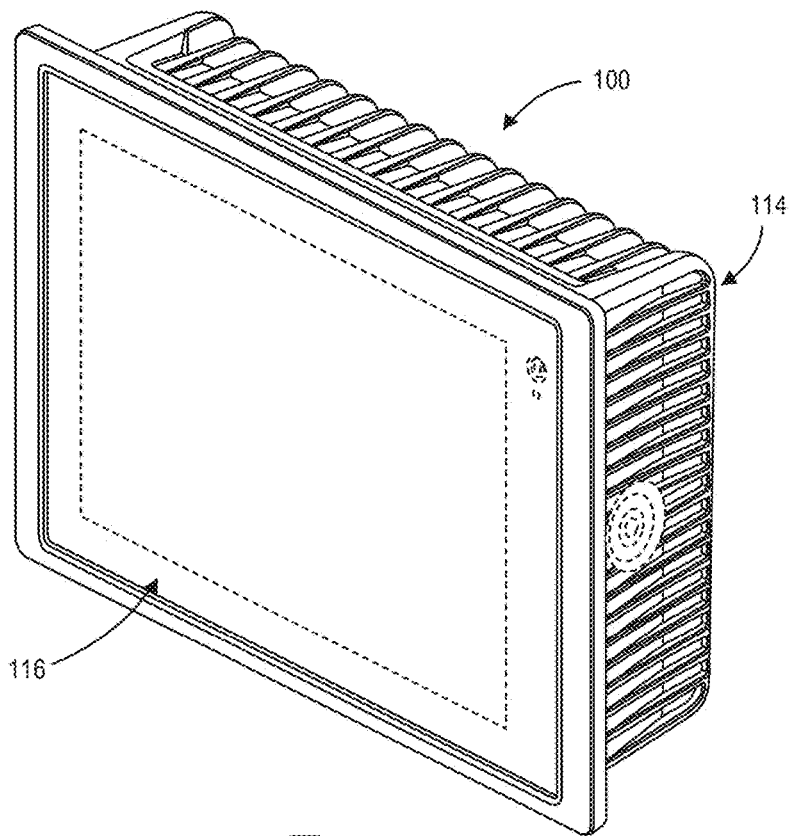
FIG. 5 is a front perspective view of the marine sonar display device.
Figure 6:
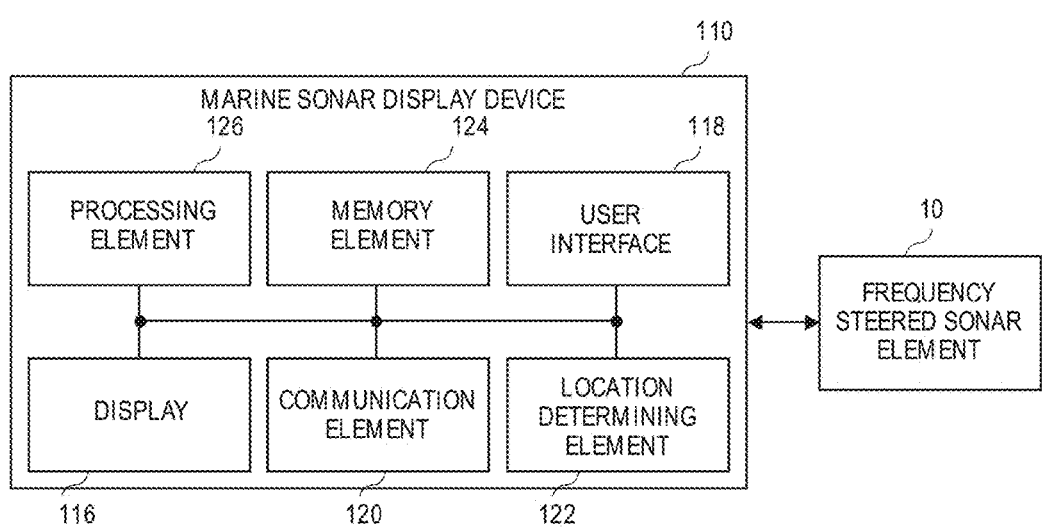
FIG. 6 is a schematic block diagram of at least a portion of the components of the marine sonar display device also illustrating that the marine sonar display device interfaces with a frequency steered sonar element.

The housing 114, as shown in FIG. 5, generally encloses and protects the other components from moisture, vibration, impact, and interference. The housing 114 may include mounting hardware for removably securing the marine sonar display device 100 to a surface within the marine vessel or may be configured to be panel-mounted within the marine vessel. The housing 114 may be constructed from a suitable lightweight and impact-resistant material such as, for example, plastic, nylon, aluminum, or any combination thereof. The housing 114 may include one or more appropriate gaskets or seals to make it substantially waterproof or resistant. The housing 114 may take any suitable shape or size, and the particular size, weight and configuration of the housing 114 may be changed without departing from the scope of the present technology.

The display 116, as shown in FIG. 5, may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 116 may possess a square or a rectangular aspect ratio and may be viewed in either a landscape or a portrait mode. In various embodiments, the display 116 may also include a touch screen occupying the entire screen or a portion thereof so that the display 116 functions as part of the user interface 118. The touch screen may allow the user to interact with the marine sonar display device 100 by physically touching, swiping, or gesturing on areas of the screen.

The user interface 118 generally allows the user to utilize inputs and outputs to interact with the marine sonar display device 100. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, or the like, or combinations thereof. With the user interface 118, the user may be able to control the features and operation of the display 116 and the marine sonar display device 100. For example, the user may be able to zoom in and out on the display 116 using either virtual onscreen buttons or actual pushbuttons. In addition, the user may be able to pan the image on the display 116 either by touching and swiping the screen of the display 116 or by using multidirectional buttons or dials.

The communication element 120 generally allows communication with external systems or devices. The communication element 120 may include signal or data transmitting and receiving circuits, such as antennas, amplifiers, filters, mixers, oscillators, digital signal processors (DSPs), and the like. The communication element 120 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 120 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 120 may establish communication through connectors or couplers that receive metal conductor wires or cables or optical fiber cables. The communication element 120 may be in communication with the processing element 126 and the memory element 124.

The location determining element 122 generally determines a current geolocation of the marine sonar display device 100 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 122 may accompany or include an antenna to assist in receiving the satellite signals. The antenna may be a patch antenna, a linear antenna, or any other type of antenna that can be used with location or navigation devices. The location determining element 122 may include satellite navigation receivers, processors, controllers, other computing devices, or combinations thereof, and memory. The location determining element 122 may process a signal, referred to herein as a "location signal", from one or more satellites that includes data from which geographic information such as the current geolocation is derived. The current geolocation may include coordinates, such as the latitude and longitude, of the current location of the marine sonar display device 100. The location determining element 122 may communicate the current geolocation to the processing element 126, the memory element 124, or both.

Although embodiments of the location determining element 122 may include a satellite navigation receiver, it will be appreciated that other location-determining technology may be used. For example, cellular towers or any customized transmitting radio frequency towers can be used instead of satellites may be used to determine the location of the marine sonar display device 100 by receiving data from at least three transmitting locations and then performing basic triangulation calculations to determine the relative position of the device with respect to the transmitting locations. With such a configuration, any standard geometric triangulation algorithm can be used to determine the location of the marine sonar display device 100. The location determining element 122 may also include or be coupled with a pedometer, accelerometer, compass, or other dead-reckoning components which allow it to determine the location of the marine sonar display device 100. The location determining element 122 may determine the current geographic location through a communications network, such as by using Assisted GPS (A-GPS), or from another electronic device. The location determining element 122 may even receive location data directly from a user.

The memory element 124 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 124 may be embedded in, or packaged in the same package as, the processing element 126. The memory element 124 may include, or may constitute, a "computer-readable medium". The memory element 124 may store the instructions, code, code segments, software, firmware, programs, applications, apps, services, daemons, or the like that are executed by the processing element 126. The memory element 124 may also store settings, data, documents, sound files, photographs, movies, images, databases, and the like.

The processing element 126 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 126 may generally execute, process, or run instructions, code, code segments, software, firmware, programs, applications, apps, processes, services, daemons, or the like. The processing element 126 may also include hardware components such as finite-state machines, sequential and combinational logic, and other electronic circuits that can perform the functions necessary for the operation of the current invention. The processing element 126 may be in communication with the other electronic components through serial or parallel links that include universal busses, address busses, data busses, control lines, and the like.

Figure 9:
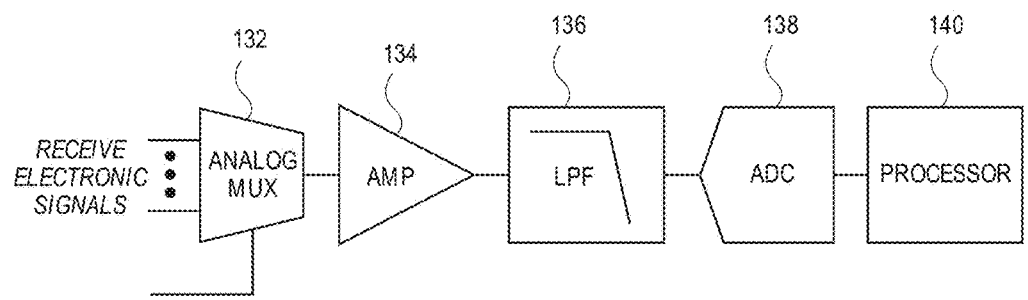
FIG. 9 is a schematic block diagram of at least a portion of the components of electronic circuitry that may be utilized with the marine sonar display device to process signals from the frequency steered sonar element.

In some embodiments, the processing element 126 may further include the electronic circuitry of FIG. 9. In other embodiments, the processing element 126 may be in communication with the electronic circuitry of FIG. 9. The electronic circuitry may include an analog multiplexer (MUX) 132, an amplifier 134, a low pass filter 136, an analog to digital converter (ADC) 138, and a processor 140. The analog MUX 132 may include generally known electronic circuitry, such as a plurality of transistor-based switches, that provide a signal selection function. The analog MUX 132 typically has a plurality of select control lines, a plurality of analog signal inputs, and one output. The analog MUX 132 allows one of the inputs to pass through to the output. When utilized with the current technology, the analog MUX 132 has the receive electronic signals as inputs. Based on the state of the select control lines, the analog MUX 132 presents one of the receive electronic signals at the output.

The amplifier 134 may include small signal amplifier circuits as are generally known. The amplifier 134 may amplify the receive electronic signal communicated from the analog MUX 132.

The low pass filter 136 may include filtering circuitry which passes frequencies of a signal lower than a certain cutoff frequency and filters frequencies greater than the cutoff, as is generally known. The low pass filter 136 may function as an anti-aliasing filter. Thus, the cutoff frequency may be chosen to be approximately twice the maximum frequency component of the receive electronic signal. The low pass filter 136 may filter the receive electronic signal communicated from the amplifier 134.

The ADC 138 may include generally known circuitry capable of or configured to sample an analog signal and generate digital data which corresponds to the sampled values. The ADC 138 may convert the receive electronic signal communicated from the low pass filter 136 into digital data that may be presented in a serial stream.

The processor 140 may include DSPs, FPGAs, ASICs, or the like. In various embodiments, the processor 140 may be the same component as, or integrated with, the processing element 126. The processor 140 along with the other components of FIG. 5 may perform the signal processing of the receive electronic signals discussed below in addition to, or instead of, the processing element 126.

By utilizing hardware, software, firmware, or combinations thereof, the processing element 126 may perform the following functions. The processing element 126 may operate the frequency steered sonar element 10 in order to receive signals and/or data that can be converted into sonar images. In order for the frequency steered sonar element 10 to perform a sweep, the processing element 126 may generate a transmit electronic signal. The transmit electronic signal may include one or more single-ended electronic signals or one or more differential electronic signals. The processing element 126 may be preprogrammed with the parameters of the signals, such as frequency, etc., or may determine the parameters based on the performance specifications of the frequency steered sonar element 10. In some embodiments, the processing element 126 may generate the transmit electronic signal as a sequence of spaced-apart-in-time pulses, wherein each pulse is an oscillating electrical voltage or electrical current that includes one of a plurality of frequency components. Thus, the processing element 126 may generate a first pulse including a first frequency component, wait for a period of time, generate a second pulse including a second frequency component, wait for the period of time, generate a third pulse including a third frequency component, and so forth. For example, using the preceding method, the processing element 126 may generate the transmit electronic signal as a sequence of four pulses, each including a different frequency component. In other embodiments, the processing element 126 may generate the transmit electronic signal as at least one broadband pulse that includes a plurality of frequency components. As an example, the processing element 126 may generate the broadband pulse to include four frequency components. The number of frequency components to include in the transmit electronic signal may be determined based on the specifications of the frequency steered sonar element 10, the construction of the display 116, user selected settings, or the like.

Figure 1:
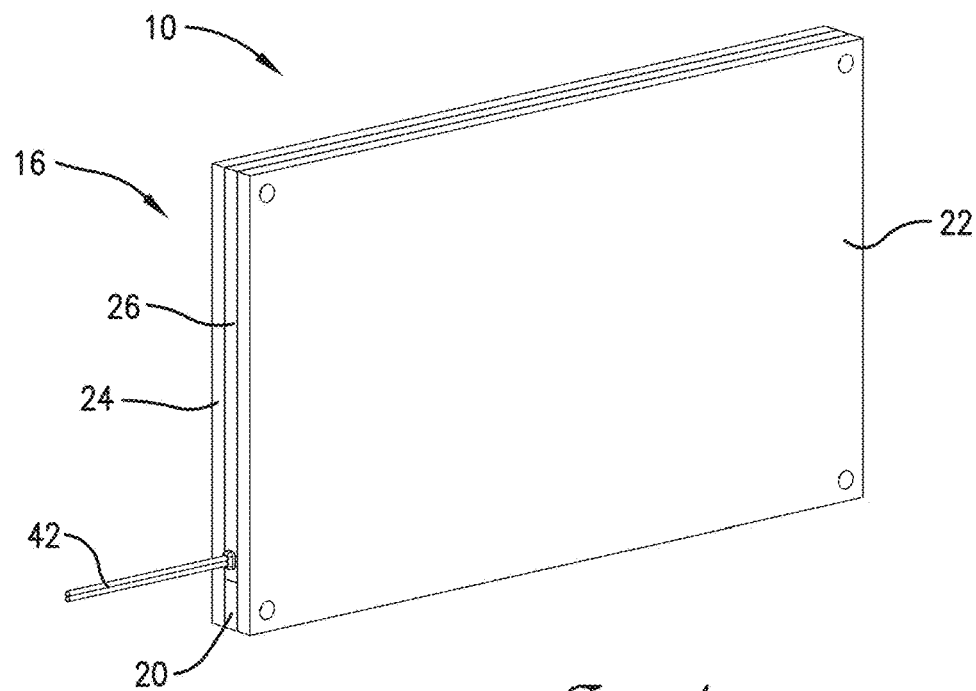
FIG. 1 is an upper perspective view of a frequency steered sonar element, constructed in accordance with a first embodiment of the present technology, including a housing with spaced apart first and second walls with filler material placed therebetween.
Figure 2:
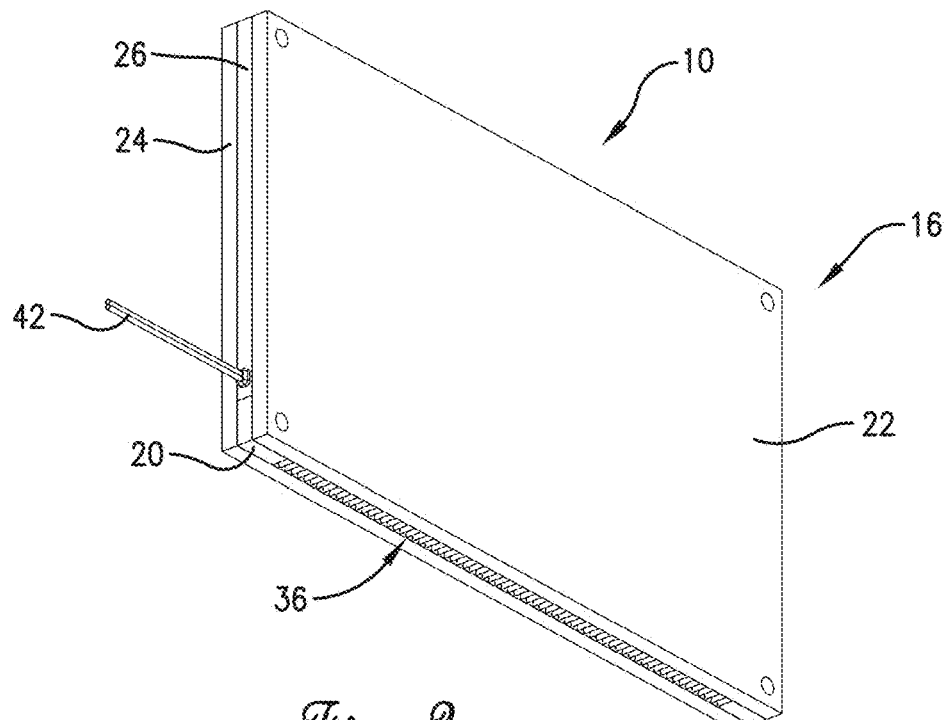
FIG. 2 is a lower perspective view of the frequency steered sonar element including a grating element positioned between the two walls, the grating element including a plurality of grooves.
Figure 3:
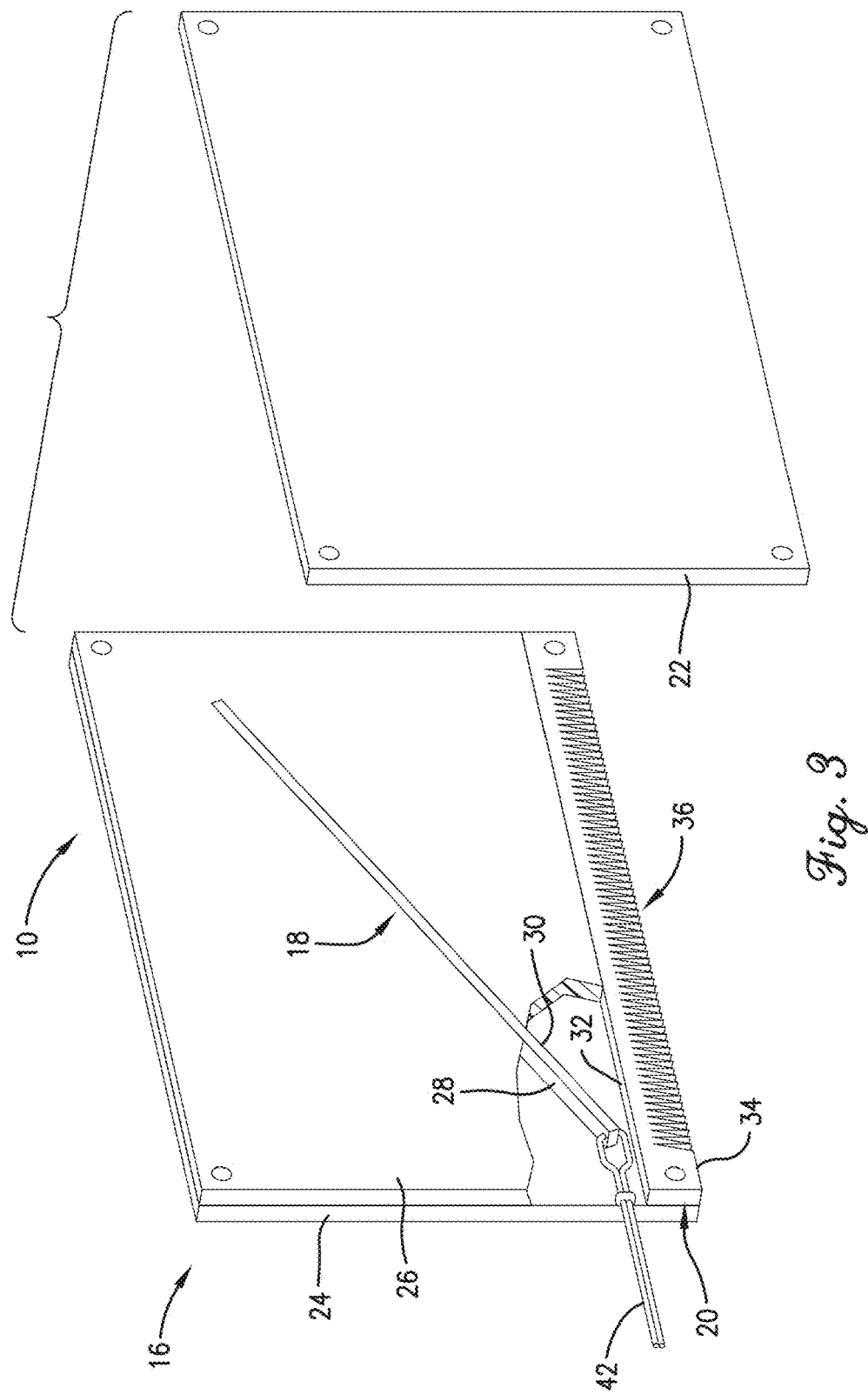
FIG. 3 is a perspective view of the frequency steered sonar element with the first wall separated from the housing to expose the grating element and a transducer element and a portion of the filler material removed to display a cable electrically connected to the transducer element.
Figure 4:
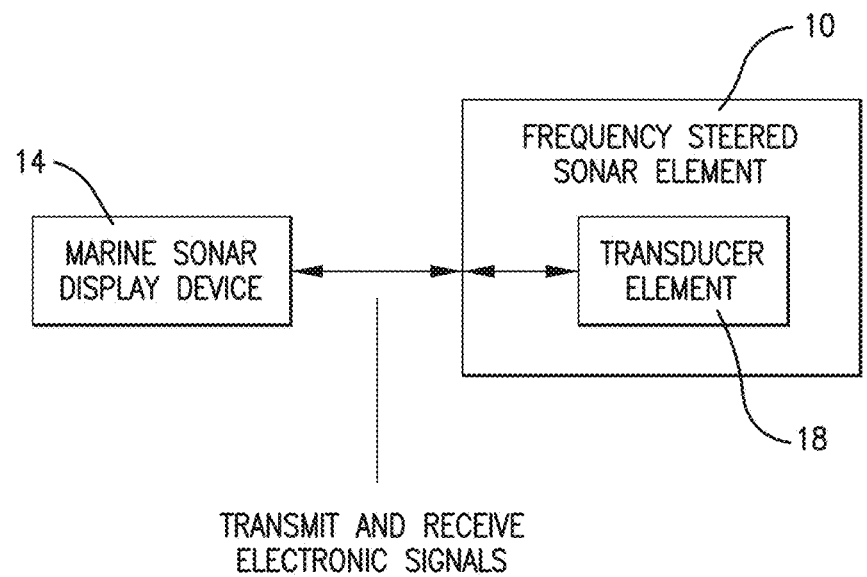
FIG. 4 is a schematic block diagram of the frequency steered sonar element interfacing with a marine sonar display device.

With the exemplary frequency steered sonar element 10 of FIGS. 1-3, the processing element 126 may generate the transmit electronic signal, with either a sequence of four single frequency component pulses or a broadband pulse that includes four frequency components, which will cause the frequency steered sonar element 10 to transmit the sonar beam 12 in the appropriate angular direction, so that after all of the sonar beams 12 have been transmitted, one sonar wedge 44 is formed.

The processing element 126 may communicate the array of transmit electronic signals one at a time in sequence to the frequency steered sonar element 10. The transmit electronic signals may present or include analog signals, digital signals, digital data, or combinations thereof. Under normal operation, the processing element 126 may repeatedly generate and communicate the array of transmit electronic signals so as to ultimately produce sonar images in motion.

The processing element 126 may receive a receive electronic signal from the frequency steered sonar element 10 as the sonar element 10 receives reflections of the sonar beams 12. Likewise with the transmit electronic signal, the receive electronic signal may include one or more single-ended electronic signals or one or more differential electronic signals. The receive electronic signal may include a steady stream of data or activity as the result of receiving reflections of the sonar beams 12 from various angular directions. Furthermore, as discussed above, the receive electronic signal may include a plurality of frequency components, each of which may be associated with one of the sonar beams 12 and may indicate the angular direction from which reflections of the sonar beam 12 were received. Typically, the frequency components of the receive electronic signal are the same as the frequency components of the transmit electronic signal. The processing element 126 may analyze the receive electronic signal and determine the frequency components thereof. As an example, the processing element 126 may repeatedly perform frequency domain transforms, such as a fast Fourier transform (FFT), to determine the frequency components of the receive electronic signal. The processing element 126 may calculate an array of sonar data slices, each sonar data slice including sonar data that is calculated from one of the frequency components of the receive electronic signal. For example, each sonar data slice may include characteristics such as an amplitude and a delay, among others, of a particular frequency component of the receive electronic signal. Each sonar data slice includes sonar data for one sonar beam 12 of one sonar wedge 44, and the array of sonar data slices includes all of the sonar data for one sonar wedge 44. The processing element 126 generally performs the sonar data slice calculations on a repeated or continuous basis.

The processing element 126 may generate an array of sonar image slices 142 for each sonar wedge 44. Each sonar image slice 142 may be generated from a corresponding one of the array of sonar data slices and may be associated with the angular direction of the receive electronic signal from which the sonar data slice was calculated. Each sonar image slice 142 may include the sonar imagery for a region of the water associated with the sonar beam 12 at the corresponding angular direction. The entire array of sonar image slices 142 may include the sonar imagery for all of one sonar wedge 44.

Figure 10:
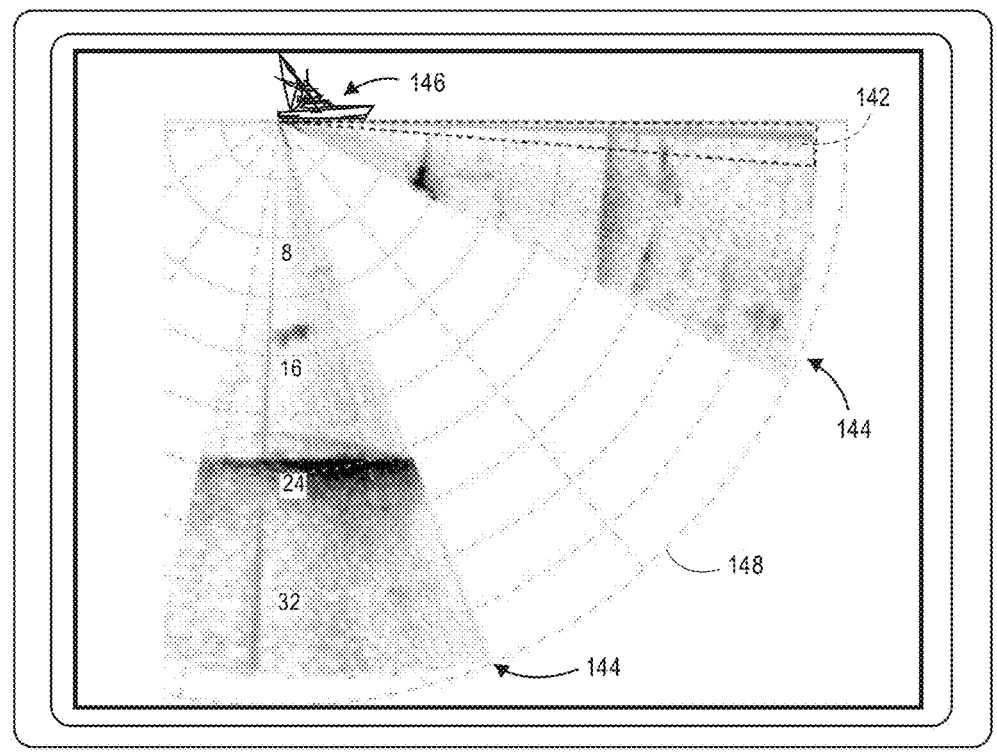
FIG. 10 is a screen capture taken from the display of the marine sonar display device presenting a forward-projecting near real time sonar wedge image and a downward-projecting near real time sonar wedge image.

During normal operation, the processing element 126 may repeatedly generate the transmit electronic signal to sweep the sonar beam 12. In turn, the processing element 126 may repeatedly calculate the array of sonar data slices. And, the processing element 126 may repeatedly generate the array of sonar image slices 142, one for each array of sonar data slices. In addition, the processing element 126 may control the display 116 to repeatedly present the array of sonar image slices 142, which forms a sonar wedge image 144. Since there is little delay between the processing element 126 generating the transmit electronic signal and the processing element generating the resulting sonar wedge image 144, the sonar wedge images 144 may be considered "near real time". Furthermore, the processing element 126 may control the display 116 to present one near real time sonar wedge image 144 for each sonar wedge 44 that is transmitted by the frequency steered sonar element 10. An example is shown in FIG. 10, wherein the display 116 may present a first near real time sonar wedge image 144 for a first sonar wedge 44 transmitted in the forward direction of the marine vessel and a second near real time sonar wedge image 144 for a second sonar wedge 44 transmitted in the downward direction. (In FIG. 10, one of the sonar image slices 142 for the first near real time sonar wedge image 144 is illustrated in dashed lines. The dashed lines may not normally be presented on the display 116.)

The processing element 126 may additionally control the display 116 to present indicia 146 to depict the marine vessel. The indicia 146 may be positioned with regard to the near real time sonar wedge images 144 to properly portray the relationship between the marine vessel and the sonar wedges 44. The processing element 126 may further control the display 116 to present a circular grid 148 to depict the ranges of distance in the water from the frequency steered sonar element 10.

The processing element 126 may store in the memory element 124 a plurality of arrays of sonar data slices. In various embodiments, the processing element 126 may store the sonar data slice arrays for a certain period of time—say, 30 seconds, 1 minute, 2 minutes, etc. Alternatively or additionally, the processing element 126 may store the sonar data slice arrays for a certain number of frames to be presented on the display 116.

Figure 11A:
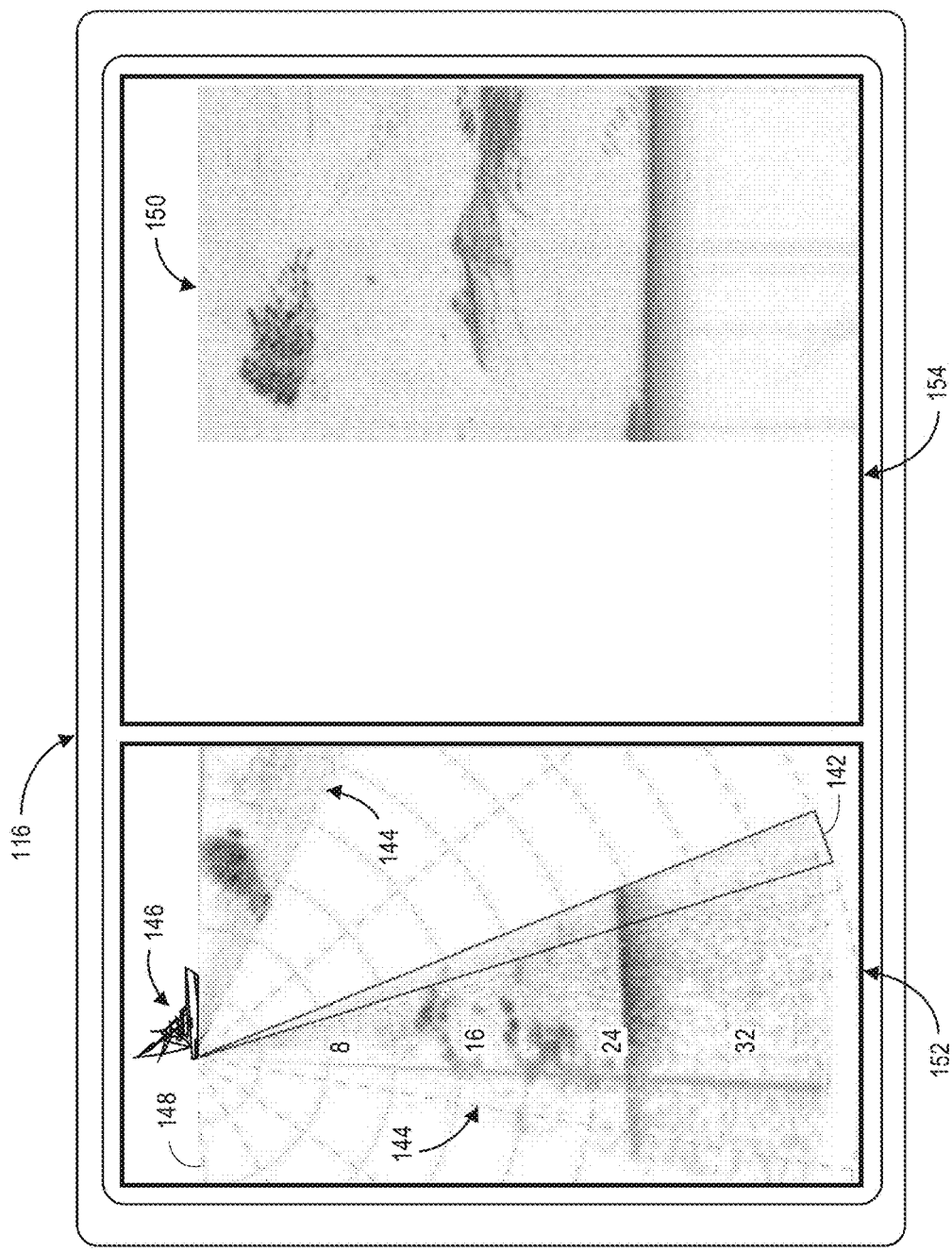

The processing element 126 may generate a historical sonar image 150 formed from the previously generated sonar image slices 142 derived from one or more sonar beams 12. In various embodiments, the processing element 126 may retrieve previously stored sonar data slices in order to generate the historical sonar image 150. The processing element 126 may further control the display 116 to present the historical sonar image 150. In exemplary embodiments shown in FIGS. 11A and 11B, the processing element 126 may present one historical sonar image 150 on a portion of the display 116. In some embodiments, the processing element 126 may crop a portion of one or more of the near real time sonar wedge images 144 and present them in a first window 152 or frame, while presenting the historical sonar image 150 in a second window 154. In other embodiments, the processing element 126 may not crop the near real time sonar wedge images 144. Alternatively, the processing element 126 may present only the historical sonar image 150 in the first window 152 and may not present any of the near real time sonar wedge images 144. As shown in FIGS. 11A and 11B, one sonar image slice 142 (representing the reflections from one sonar beam 12) has been selected from the downward directed near real time sonar wedge image 144 for which the historical sonar image 150 is generated. Typically, the sonar image slice 142, for which the historical sonar image 150 is generated, is highlighted on the display 116 such as with a different color or an outline. A user may select the sonar image slice 142 using the user interface 118, or the processing element 126 may automatically select the sonar image slice 142 based on various signal and/or system parameters, such as merit, sensitivity, signal to noise, orientation, beamwidth, combinations thereof, and the like. In addition, more than one adjacent sonar image slice 142 may be selected for which the historical sonar image 150 is generated. The sonar image slices 142 may, for example, be averaged, weighted averaged, summed, or the like when they used to generate the historical sonar image 150.

When the processing element 126 is controlling the display 116 to present the historical sonar image 150, the most recently generated sonar image slice 142 may be presented in a fixed or constant location in the second window 154. Those sonar image slices 142 that were previously generated may scroll in the second window away from the most recently generated sonar image slice 142 with the oldest sonar image slice 142 being farthest away from the most recently generated sonar image slice 142. In the embodiment of FIGS. 11A and 11B, the sonar image slices 142 scroll from right to left in the second window. In FIG. 11A, the sonar image slices 142 for, say, the previous 15 seconds, or the last 50 feet that the marine vessel has traveled, are shown on the display 116, while in FIG. 11B, the sonar image slices 142 for, say, the previous 30 seconds, or the last 100 feet that the marine vessel has traveled, are shown, with those sonar image slices 142 from FIG. 11A having scrolled to the left.

Focusing in more detail on the frequency steered sonar element 10, it may broadly comprise a housing 16, a transducer element 18, and a grating element 20, as best seen in FIGS. 1-3.

The housing 16 generally encloses the transducer element 18 and the grating element 20 and may include a first wall 22, a second wall 24, and a filler material 26. The first and second walls 22, 24 may each have a roughly square or rectangular plate shape and may be constructed from a metal or metal alloy, such as aluminum. The first and second walls 22, 24 may be spaced apart from one another with the transducer element 18 and the grating element 20 positioned therebetween. The filler material 26, such as a potting material, an epoxy, or the like, may fill the remaining space between the two walls 22, 24. Alternatively, the filler material 26 may be a fluid, such as oil or water. In some embodiments, the housing 16 may include one or more spacers positioned between the first and second walls 22, 24 in addition to the filler material 26. The spacers may be constructed from rigid materials such as metals or plastic and may be positioned along three of the edges of the first and second walls 22, 24, such that the spacers are in contact with inner surfaces of each wall 22, 24.

The transducer element 18 may be formed from piezoelectric material, like ceramics such as lead zirconate titanate (PZT) or polymers such as polyvinylidene difluoride (PVDF), which transform electrical energy into mechanical energy and vice-versa. The transducer element 18 may have an elongated rectangular box or bar shape with a top surface 28, a bottom surface 30, two side surfaces, and two end surfaces. The dimensions of the transducer element 18 may be determined by, or may vary according to, the operation of the transducer element 18. The length (from end surface to end surface) of the transducer element 18 may be directly proportional to a desired resolution of the received reflections from the sonar beam 12, which, in turn, determines a resolution of sonar images displayed on the marine sonar display device 100. That is, a greater length of the transducer element 18 generally results in greater resolution of on-screen sonar images. An exemplary length may range from approximately 60 millimeters (mm) to approximately 100 mm. The width (from side surface to side surface) of the transducer element 18 may determine a width of the sonar beam 12 and may also determine resonant frequency modes of the sonar beam 12. An exemplary width may be approximately 4 mm. The height or thickness (from the top surface 28 to the bottom surface 30) of the transducer element 18 may determine a resonant frequency component of the sonar beam 12. An exemplary height may range from approximately 1 mm to approximately 4 mm.

The transducer element 18 may function as an acoustic (pressure) wave transmitter or an acoustic wave receiver. When operating as an acoustic wave transmitter, the transducer element 18 may generate or transmit pressure, acoustical, mechanical, and/or vibrational waves with magnitude and frequency components that correspond to the magnitude and frequency components of the transmit electronic signal. When operating as an acoustic wave receiver, the transducer element 18 may generate the receive electronic signal with magnitude and frequency components that correspond to the magnitude and frequency components of the pressure, acoustical, mechanical, and/or vibrational waves impinging on one or more of the surfaces of the transducer element 18. In various embodiments, the transmit and receive electronic signals may be analog signals with a periodically varying electric voltage. The transmit and receive electronic signals may include other periodically varying characteristics or parameters, such as electric current.

The grating element 20 generally functions as a sonar beam 12 former and may have an elongated rectangular box or bar shape with a top surface 32, a bottom surface 34, two end surfaces, and two side surfaces. In addition, in an exemplary embodiment best seen in FIG. 3, the grating element 20 may include a plurality of grooves 36 positioned on the bottom surface 30. However, the grooves 36 may be positioned on either surface 32, 34, or on both surfaces 32, 34. The grooves 36 may be oriented such that the length of each groove 36 extends from one side surface to the other side surface, and the grooves 36 are positioned adjacent one another from one end surface to the other end surface. Each groove 36 may include a first facet 38 and a second facet 40, with at least one of the facets 38, 40 being oriented at an acute angle with respect to the bottom surface 30 such that the facets 38, 40 have a sawtooth or isosceles triangle profile. As seen in FIG. 3, the grooves 36 all have the same depth. In alternative embodiments, the grooves 36 may have a variable depth and the dimensions of the facets 38, 40 may vary, such that the grooves 36 appear non-uniform. In some embodiments, the facets 38, 40 may be rounded so that the grooves 36 have a sinusoidal, or roughly sinusoidal, profile. The height or amplitude of the sinusoid across all of the grooves 36 may be constant or may vary. In other embodiments, the facets 38, 40 may have any shape such that all of the grooves 36 in combination have a regular periodic profile. In still other embodiments, the grating element 20 may include just a single groove 36 from one end surface to the opposing end surface that has a cosine, sine, triangle, sawtooth, or other profile. The grating element 20, and particularly the grooves 36, may be formed by molding processes, subtractive processes such as etching or machining, or additive processes such as 3D printing. The grating element 20 may be constructed from materials that are conductive or transmissive to acoustic waves and/or sonar beams, such as silicone rubber or similar polymers and various metals.

The grating element 20 may have a length that is generally greater than the length of the transducer element 18 and a width that is roughly equivalent to the width thereof. The grating element 20 may have a height that is determined by, or varies according to, the depth of the grooves 36. The dimensions of the grooves 36, including the depth and pitch (or spacing from groove 36 to groove 36), may be determined by, or vary according to, the frequency component of the sonar beam 12.

The frequency steered sonar element 10 may have a construction as follows. The grating element 20 may be positioned between the first and second walls 22, 24 of the housing 16 such that the side surfaces contact the inner surfaces of the walls 22, 24, and the bottom surface 34 is aligned with lower surfaces or edges of the walls 22, 24. The grooves 36 may be accessible or visible between the lower surfaces or edges of the walls 22, 24. The transducer element 18 may be positioned between the first and second walls 22, 24 such that the side surfaces contact the inner surfaces of the walls 22, 24. The transducer element 18 may be spaced apart from the grating element 20 and oriented such that a longitudinal axis of the transducer element 18 and a longitudinal axis of the grating element 20 form an acute angle. The bottom surface 30 of the transducer element 18 faces the top surface 32 of the grating element 20. Electrodes may electrically connect to two or more opposing surfaces of the transducer element 18. The electrodes may also electrically connect to an external electrically conductive cable 42. The remaining space within the housing 16 may be filled with filler material 26.

Figure 12:
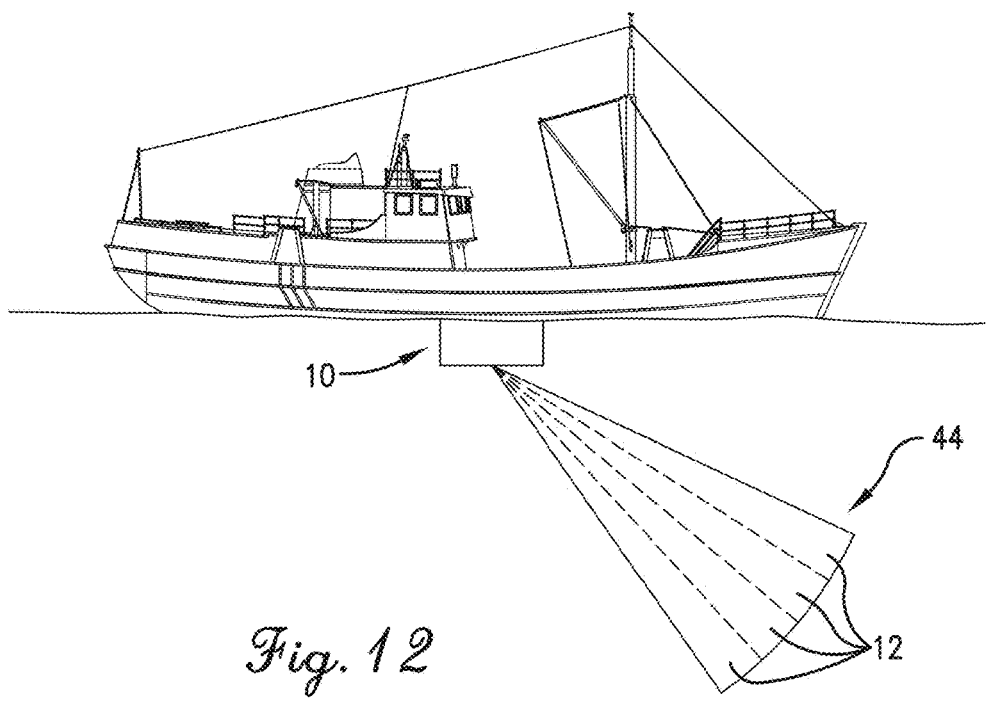
FIG. 12 is a view of the frequency steered sonar element mounted to the marine vessel, the sonar element transmitting a plurality of sonar beams into a body of water.

The frequency steered sonar element 10 may be electrically connected to the marine sonar display device 100 through the cable 42. The marine sonar display device 100 is typically located in the navigation area of a marine vessel. The frequency steered sonar element 10 may be mounted on the bottom of a hull of the marine vessel, as shown in FIG. 12. However, in general, the frequency steered sonar element 10 may be mounted anywhere on the hull below the waterline. The frequency steered sonar element 10 may be mounted directly on the hull or may be attached with brackets, transom and trolling mounts, and the like. In addition, the frequency steered sonar element 10 may be reoriented about one, two, or three axes through the use of a mechanism, such as a motor assembly. Furthermore, the frequency steered sonar element 10 may be configured for towing behind the marine vessel or for use with a remote operated vehicle (ROV) or autonomous vehicle associated with the marine vessel.

The frequency steered sonar element 10 may operate as follows. The transmit electronic signal may be communicated from the marine sonar display device 100 and received by the transducer element 18 of the frequency steered sonar element 10. The transmit electronic signal may include a frequency component. In response to receiving the transmit electronic signal, the transducer element 18 may generate at least one acoustic wave with a frequency component determined by, or equivalent to, the frequency component of the transmit electronic signal. The acoustic wave may contact the bottom surface 34 of the grating element 20 and pass through to the top surface 32 where the acoustic wave encounters the facets 38, 40 of the grooves 36 which transmit the wave. As the facets 38, 40 transmit the acoustic wave, the wave passing through each groove 36 creates an individual wavefront. The acoustic wave passing through all the grooves 36 in combination creates a plurality of spaced apart wavefronts, which in turn creates constructive and destructive wave interference in a particular geometric pattern—thereby forming a beam. Since the beam is formed in a body of water, it is a sonar beam 12. In other words, the transmission of the acoustic wave by the grating element 20 forms the sonar beam 12. The particular geometric pattern of the wave interference determines the angular direction of the sonar beam 12. And, the particular geometric pattern may be determined by, or may vary according to, a wavelength of the acoustic wave, which is inversely proportional to the frequency component of the acoustic wave. Therefore, the angular direction of the sonar beam 12 may be determined by, or may vary according to, the frequency component of the acoustic wave from the transducer element 18, which, in turn, is determined by, or varies according to, the frequency component of the transmit electronic signal.

Figure 13:
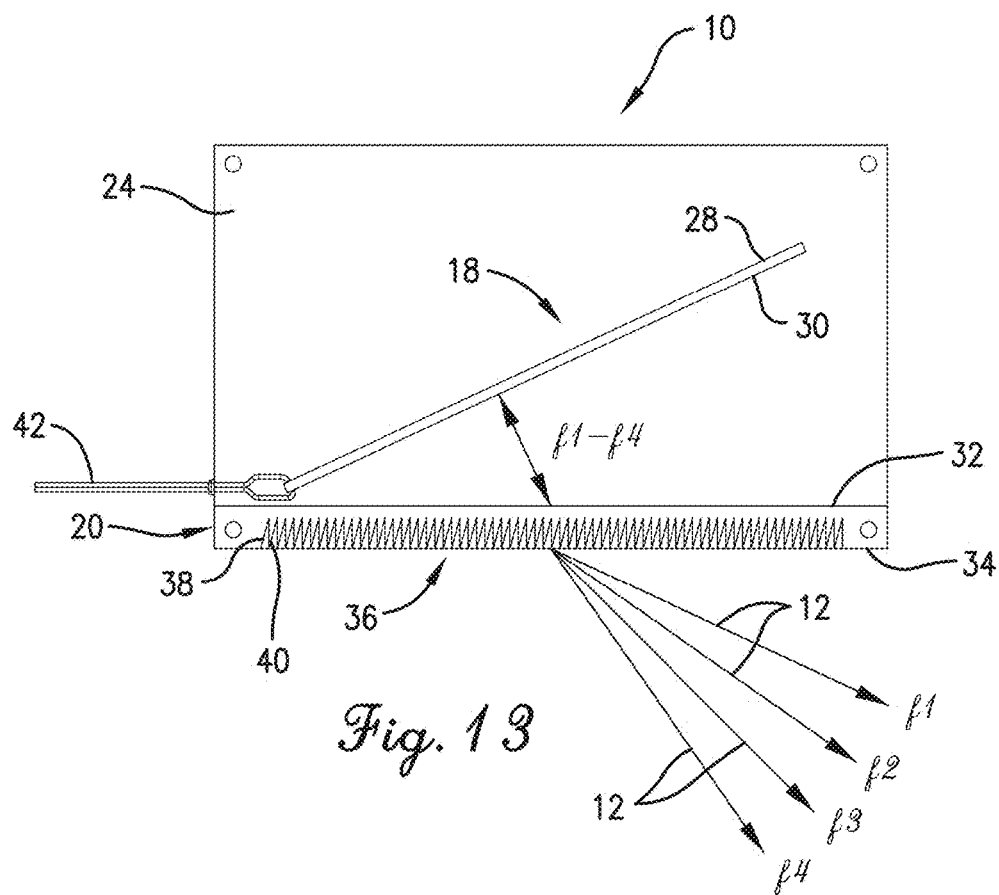
FIG. 13 is a top view of the frequency steered sonar element with the first wall and the filler material removed to illustrate the sonar element transmitting a plurality of sonar beams, each sonar beam being transmitted in an angular direction which varies according to a frequency component of the sonar beam.

Typically, the marine sonar display device 100 generates the transmit electronic signal with a plurality of frequency components—either as a sequence of spaced-apart-in-time pulses or as at least one broadband pulse. For example, the marine sonar display device 100 may communicate the transmit electronic signal with four frequency components, $f_1$-$f_4$, to the frequency steered sonar element 10. Referring to FIG. 13, the transducer element 18 may receive the transmit electronic signal and may generate four acoustic waves, with the first acoustic wave including the frequency component $f_1$, the second acoustic wave including the frequency component $f_2$, and so forth. In turn, the grating element 20 may sequentially transmit four sonar beams 12, with each sonar beam 12 being transmitted in an angular direction determined by the frequency component of the associated acoustic wave. Thus, a first sonar beam 12 may be transmitted in a first angular direction according to the frequency component $f_1$, a second sonar beam 12 may be transmitted in a second angular direction according to the frequency component $f_2$, and so forth.

Figure 7:
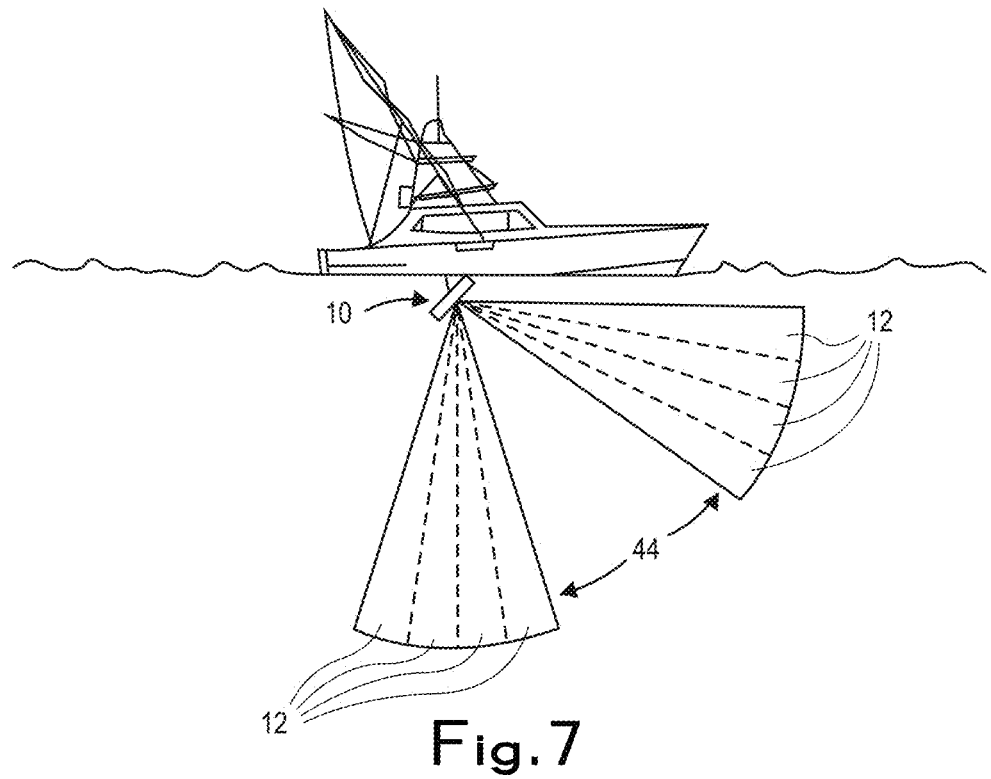
FIG. 7 is a side view of a marine vessel utilizing the marine sonar display device and the frequency steered sonar element, with the sonar element configured to transmit a first sonar wedge into the water in a forward direction and a second sonar wedge in a downward direction.
Figure 8:
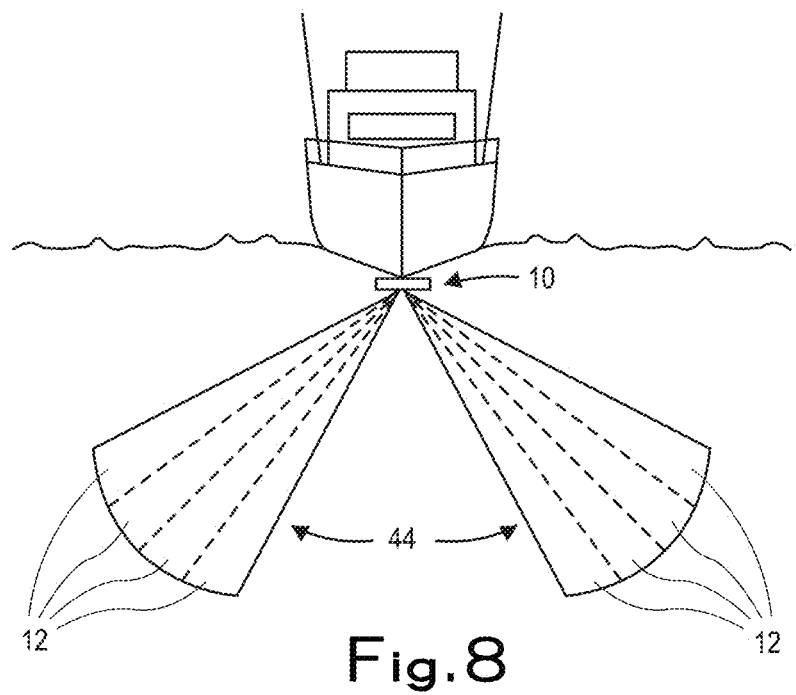
FIG. 8 is a front view of the marine vessel utilizing the marine sonar display device and the frequency steered sonar element, with the sonar element configured to transmit a first sonar wedge into the water in a port direction and a second sonar wedge in a starboard direction.
Figure 14:
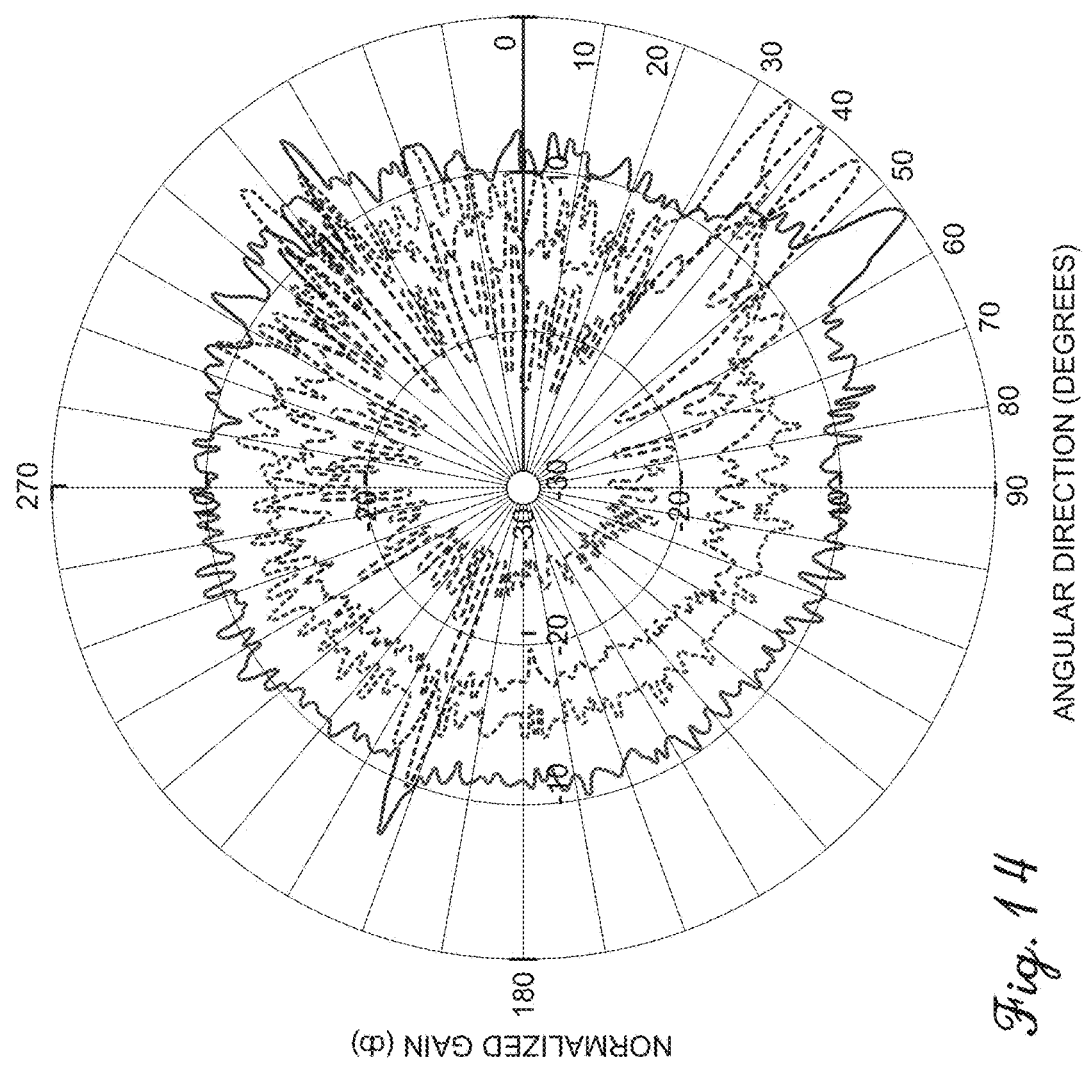
FIG. 14 is a polar plot of the gain of the sonar beam vs. the angular direction of the sonar beam for a plurality of sonar beams, each including a different frequency component.
Figure 15:
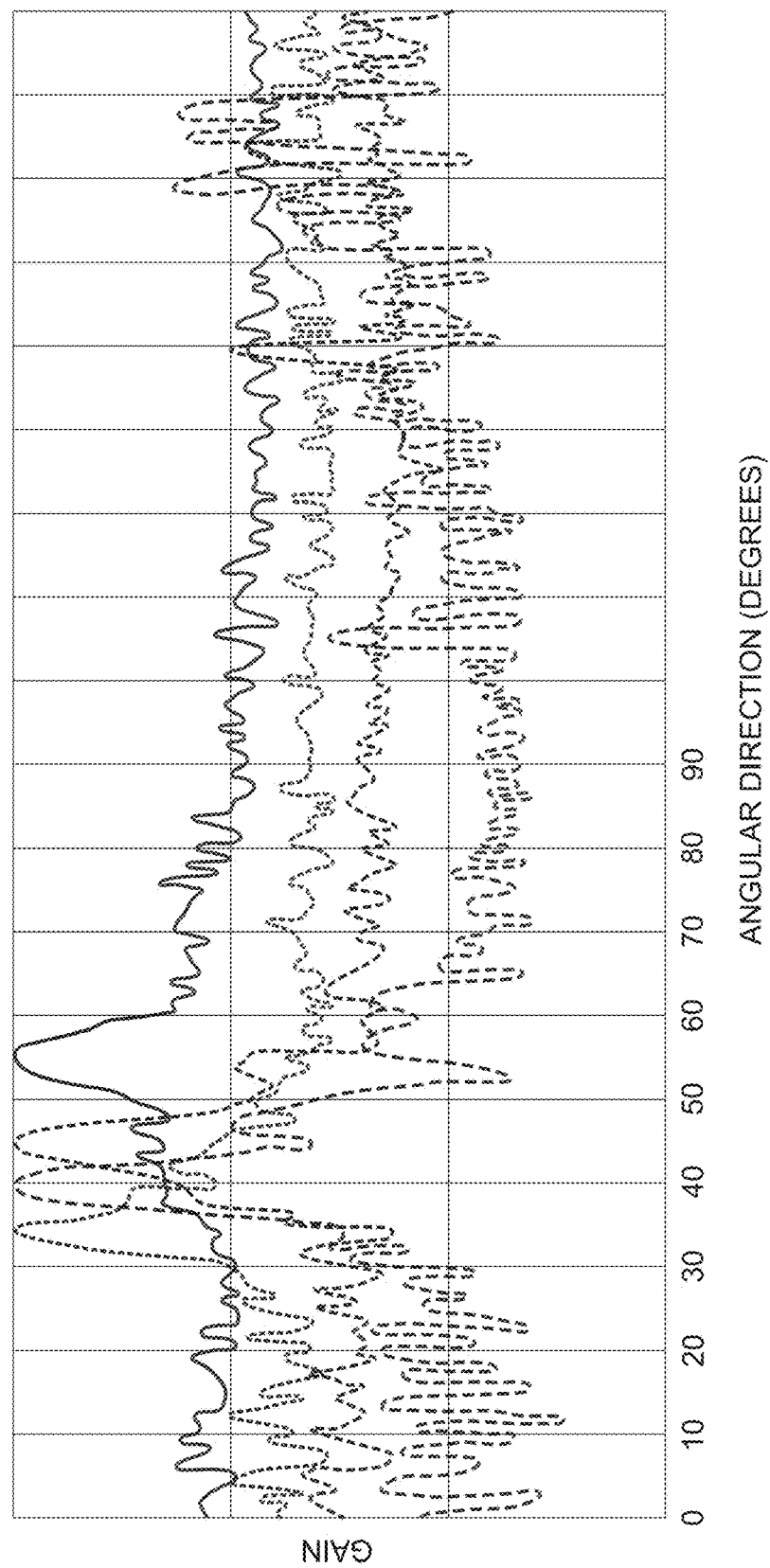
FIG. 15 is a linear, Cartesian coordinate plot of the gain of the sonar beam vs. the angular direction of the sonar beam for a plurality of sonar beams, each including a different frequency component.

The frequency components of the transmit electronic signal may be determined, or chosen, based on the dimensions and material characteristics of the transducer element 18 and the grating element 20 such that the angular directions of the sonar beams 12 are adjacent to one another. A polar frequency response plot and a linear frequency response plot of the frequency steered sonar element 10 illustrating gain and angular direction for a plurality of sonar beams 12 are shown in FIGS. 14 and 15, respectively. For the exemplary transducer element 18 and grating element 20 with dimensions and materials discussed above: frequency component $f_1$ is chosen to be approximately 380 kiloHertz (kHz), yielding an angular direction of approximately 35 degrees; frequency component $f_2$ is chosen to be approximately 400 kiloHertz (kHz), yielding an angular direction of approximately 40 degrees; frequency component $f_3$ is chosen to be approximately 420 kiloHertz (kHz), yielding an angular direction of approximately 45 degrees; and frequency component $f_4$ is chosen to be approximately 450 kiloHertz (kHz), yielding an angular direction of approximately 55 degrees. When the frequency components of the transmit electronic signal are chosen in this fashion, the array of resulting sonar beams 12 may form the sonar wedge 44, which covers a particular volume of water, as illustrated in FIGS. 7, 8, and 12. The reflections from the sonar wedge 44 form sonar imagery which is displayed on the marine sonar display device 100.

In addition, the process of the frequency steered sonar element 10 receiving the transmit electronic signal and transmitting a corresponding array of sonar beams 12 may be known as a "sweep", a "frequency sweep", a "sonar beam sweep", etc. When a sweep occurs and an array of sonar beams 12 are transmitted in adjacent angular directions, a sonar wedge 44 may be formed which includes the volume in the water covered by the adjacent sonar beams 12. FIGS. 7 and 8 show examples of the frequency steered sonar element 10 in operation. FIG. 7 illustrates the frequency steered sonar element 10 transmitting a first sonar wedge 44 in the forward direction and a second sonar wedge 44 in the downward direction, each sonar wedge 44 being formed by an exemplary array of four sonar beams 12, each transmitted with a different frequency component. The dashed lines in FIGS. 7 and 8 indicate the virtual boundaries of each sonar beam 12. FIG. 8 illustrates the frequency steered sonar element 10 transmitting a first sonar wedge 44 in the left or port direction and a second sonar wedge 44 in the right or starboard direction. Likewise as in FIG. 7, each sonar wedge 44 in FIG. 8 is formed by one array of four sonar beams 12.

The implementations of the frequency steered sonar element 10 of FIGS. 7 and 8, wherein the sonar element 10 transmits two spaced apart sonar wedges 44, each formed by four sonar beams 12, are merely exemplary. The frequency steered sonar element 10 may be capable of transmitting greater or fewer numbers of sonar wedges 44, each formed by greater or fewer numbers of sonar beams 12. In addition, the spacing between each sonar wedge 44 may vary. Furthermore, the angular size of each sonar wedge 44 may vary. Each sonar wedge 44 of FIGS. 7 and 8 may have an angular size from approximately 40 to 45 degrees. The frequency steered sonar element 10 may be capable of transmitting a single sonar wedge 44 with an angular size of up to 180 degrees.

The frequency steered sonar element 10 may generate the receive electronic signal in response to receiving reflections of the sonar beam 12 bouncing off objects in the water and the water bed. Specifically, the reflections of the sonar beam 12 may contact the facets 38, 40 of the grating element 20 and pass therethrough to the top surface 32, wherein an acoustic wave is formed and directed toward the transducer element 18. As a result of the acoustic wave impinging the transducer element 18, it generates the receive electronic signal with a frequency component determined by, or equivalent to, the frequency component of the acoustic wave from the grating element 20, which, in turn, is determined by, or equivalent to, the frequency component of the reflections of the sonar beam 12. The frequency component of the receive electronic signal indicates the angular direction from which the reflections of the sonar beam 12 were received.

If an array of sonar beams 12 was transmitted, then an array of reflections may be received. When the frequency steered sonar element 10 receives the array of reflections, it may generate the receive electronic signal with a plurality of frequency components, each frequency component indicating the angular direction from which the reflections of one of the sonar beams 12 were received. The receive electronic signal may be communicated to the marine display device 100.

Figure 16:
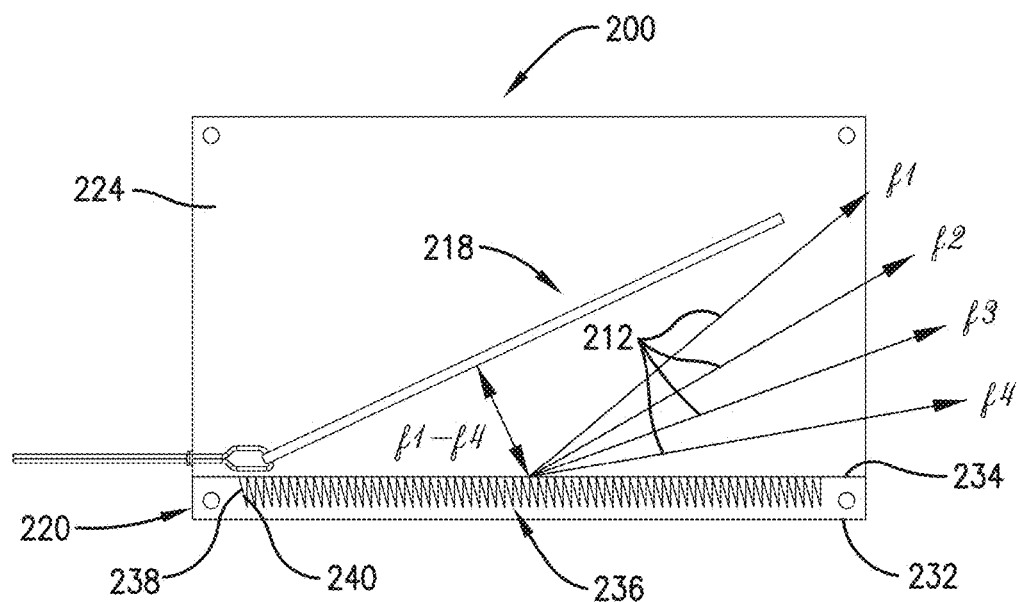
FIG. 16 is a top view of a second embodiment of the frequency steered sonar element with the first wall and the filler material removed to illustrate the sonar element transmitting a plurality of sonar beams, each sonar beam being transmitted in an angular direction which varies according to a frequency component of the sonar beam.

Referring to FIG. 16, a second embodiment of the frequency steered sonar element 200 may be provided. The frequency steered sonar element 200 may comprise a transducer element 218 and a grating element 220 along with other components that are substantially the same as the like-named components described above for the frequency steered sonar element 10. The construction of the frequency steered sonar element 200 is substantially the same as for the frequency steered sonar element 10, except that the grating element 220 is inverted with respect to the transducer element 218, so that the top surface 232 is on the bottom and the bottom surface 234 is on the top. The grooves 236 may be accessible or visible between the side surfaces or edges of the wall 224. In addition, the grating element 220 may be constructed from material that is reflective to acoustic waves with frequency components in the range of the exemplary frequency components discussed above. The frequency steered sonar element 200 may be electrically connected to the marine sonar display device 100 in the same fashion. And, the frequency steered sonar element 200 may be mounted to the marine vessel, or otherwise oriented, such that the right side surfaces (as seen in FIG. 16) of the wall 224 are pointed into the water in the general region where the sonar beams 212 are desired to be transmitted.

The frequency steered sonar element 200 may operate as follows. The transducer element 218 of the frequency steered sonar element 200 may receive the transmit electronic signal (with a frequency component), and in response, the transducer element 218 may generate at least one acoustic wave with a frequency component determined by, or equivalent to, the frequency component of the transmit electronic signal. The acoustic wave may contact the facets 238, 240 of the grooves 236 and may be reflected thereby. The reflection of the acoustic wave by each groove 236 creates an individual wavefront. The reflection of the acoustic wave by the combination of all grooves 236 creates a plurality of spaced apart wavefronts. As with the frequency steered sonar element 10 discussed above, the multiple spaced apart wavefronts create constructive and destructive wave interference in a particular geometric pattern—thereby forming a sonar beam 212. In other words, the reflection of the acoustic wave by the grating element 220 forms the sonar beam 212. Also, as with the frequency steered sonar element 10, the angular direction of the sonar beam 212 may be determined by, or may vary according to, the frequency component of the acoustic wave from the transducer element 218, which, in turn, is determined by, or varies according to, the frequency component of the transmit electronic signal.

Furthermore, if the frequency steered sonar element 200 receives the transmit electronic signal with a plurality of frequency components, for example, frequency components $f_1$-$f_4$, then it will transmit an array of sonar beams 212—each sonar beam 212 being transmitted in an angular direction determined by the frequency component $f_1$-$f_4$, as seen in FIG. 16.

The frequency steered sonar element 200 may also generate the receive electronic signal in response to receiving reflections of the sonar beam 212 bouncing off objects in the water and the water bed. Specifically, the reflections of the sonar beam 212 may contact the facets 238, 240 of the grating element 220 and reflect therefrom, forming an acoustic wave that is directed toward the transducer element 218. As a result of the acoustic wave impinging the transducer element 218, it generates the receive electronic signal with a frequency component determined by, or equivalent to, the frequency component of the acoustic wave from the grating element 220 and the frequency component of the reflections of the sonar beam 212. The frequency component of the receive electronic signal indicates the angular direction from which the reflections of the sonar beam 212 were received.

In addition, if the frequency steered sonar element 200 receives an array of sonar beam 212 reflections with, for example, frequency components $f_1$-$f_4$, then it will generate the receive electronic signal including the frequency components $f_1$-$f_4$. The frequency component may indicate the angular direction from which the reflections of one of the sonar beam 212 were received. The receive electronic signal may be communicated to the marine display device 100.

Referring to FIGS. 17-20, a third embodiment of the frequency steered sonar element 300 may be provided. The frequency steered sonar element 300 may utilize a plurality of sonar beam formers to increase the region under water for which sonar images can be generated. The frequency steered sonar element 300 may comprise a housing 316 and a plurality of sonar beam formers 350.

The housing 316 may be substantially similar to the housing 16 and may include a plurality of walls 322, with first and second outer walls 322 and a plurality of inner walls 322 that function as isolators and separators. In an exemplary embodiment, the housing 316 may include first and second inner walls 322. The housing 316 may optionally include spacers positioned between the walls. The housing 316 may further include filler material 326, substantially the same as the filler material 26. The housing 316 may be constructed as follows. The outer and inner walls may form a stack, with, for example, the first outer wall 322 on the bottom, the first and second inner walls 322 stacked next, and the second outer wall 322 on top. The inner walls 322 may be spaced apart from one another and from the outer walls 322. The filler material 326 and the sonar beam formers 350 may be positioned between the walls as described below.

Each sonar beam former 350 may include one transducer element 318 and one grating element 320 operating in combination in a similar fashion to the transducer element 18 and grating element 20 of the frequency steered sonar element 10. Each transducer element 318 may be substantially the same as the transducer element 18, and each grating element 320 may be substantially the same as the grating element 20. Each sonar beam former 350 may have the following construction. The bottom surface 330 of the transducer element 318 may face the top surface 332 of the grating element 320. The transducer element 318 may be spaced apart from the grating element 320 and oriented such that a longitudinal axis of the transducer element 318 and a longitudinal axis of the grating element 320 form an acute angle.

The frequency steered sonar element 300 may have a construction as follows. Each sonar beam former 350 may be positioned between an adjacent pair of walls within the housing 316. For example, a first sonar beam former 350 may be positioned between the first outer wall 322 and the first inner wall 322, a second sonar beam former 350 may be positioned between the first inner wall 322 and the second inner wall 322, and a third sonar beam former 350 may be positioned between the second inner wall 322 and the second outer wall 322.

Furthermore, each sonar beam former 350 may have a unique orientation within the housing 316. In the exemplary embodiment of FIG. 19, the first sonar beam former 350 may have a first orientation wherein the bottom surface 334 and the grooves 336 of the grating element 320 are aligned with lower surfaces or edges of the first outer wall 322 and the first inner wall 322. The second sonar beam former 350 may have a second orientation that is a mirror image of the first orientation, wherein the bottom surface 334 of the grating element 320 lines up with lower surfaces or edges of the first inner wall 322 and the second inner wall 322, but the angle between the transducer element 318 and the grating element 320 points in the opposite direction as the first orientation. The third sonar beam former 350 may have a third orientation that is rotated from the first orientation, wherein the bottom surface 234 of the grating element 320 forms an acute angle with lower surfaces or edges of the second inner wall 322 and the second outer wall 322. In the exemplary embodiment of the frequency steered sonar element 300 discussed herein, the angle between the transducer element 318 and the grating element 320 may be the same for each sonar beam former 350. In other embodiments, the angle between the transducer element 318 and the grating element 320 for each sonar beam former 350 may be different.

Each transducer element 318 may be electrically connected to at least two electrodes on opposing surfaces, one electrode per surface. The electrodes may also be electrically connected to an external electrically conductive cable 342. The remaining space between each pair of adjacent walls may be filled with filler material 326. The frequency steered sonar element 300 may be mounted to a marine vessel in the same manner as the frequency steered sonar element 10.

The frequency steered sonar element 300 may operate as follows. The transmit electronic signal may be communicated from the marine sonar display device 100 and received by the transducer elements 318 of each sonar beam former 350. In response, each sonar beam former 350 may transmit a sonar beam 312 in an angular direction determined by, or varying according to, a frequency component of the transmit electronic signal in the same manner described above for the frequency steered sonar element 10. Given that all three sonar beam formers 350 receive the same frequency component of the transducer electronic signal, then the angular direction, with respect to each sonar beam former 350, of each of the three sonar beams 312 may be the same. But, since each sonar beam former 350 has a unique orientation within the housing 316, the angular direction of each of the three sonar beams 312 with respect to the housing 316 is different. For example, the first sonar beam former 350 may transmit the sonar beam 312 at a first angular direction with respect to the housing 316, the second sonar beam former 350 may transmit the sonar beam 312 at a second angular direction with respect to the housing 316, and the third sonar beam former 350 may transmit the sonar beam 312 at a third angular direction with respect to the housing 316.

If the frequency steered sonar element 300 receives the transmit electronic signal with, for example four frequency components $f_1$-$f_4$, then it will transmit a plurality of arrays of sonar beams 312, one array for each sonar beam former 350. With the current exemplary frequency steered sonar element 300, a first array may be transmitted by the first sonar beam former 350, a second array may be transmitted by the second sonar beam former 350, and a third array may be transmitted by the third sonar beam former 350, as seen in FIG. 20.

The angular directions of the sonar beams 312 of each array may be determined by, or vary according to, the frequency components $f_1$-$f_4$ but also by the orientation of the sonar beam formers 350 within the housing 316. With the current exemplary frequency steered sonar element 300, the angular directions of the sonar beams 312 transmitted by the second sonar beam former 350 may be the mirror images of the angular directions of the sonar beams 312 transmitted by the first sonar beam former 350. The angular directions of the sonar beams 312 transmitted by the third sonar beam former 350 may be a rotation of the angular directions of the sonar beams 312 transmitted by the first sonar beam former 350.

The frequency steered sonar element 300 may generate one or more receive electronic signals in response to receiving reflections of the sonar beam 312 bouncing off objects in the water and the water bed. In various embodiments, for each sonar beam former 350, the frequency steered sonar element 300 may generate one receive electronic signal. With the current exemplary embodiment, the frequency steered sonar element 300 may generate three receive electronic signals. Each sonar beam former 350 receives the sonar beam 312 reflections and generates one receive electronic signal in the same manner as discussed above for the frequency steered sonar element 10. The frequency component of the receive electronic signal from each sonar beam former 350 may be the same and may indicate the angular direction from which the sonar beam 312 reflections were received with respect to the sonar beam former 350—a relative angular direction. The orientation of each sonar beam former 350 may determine the angular direction of the sonar beam 312 reflections with respect to the housing 316—the absolute angular direction.

If the frequency steered sonar element 300 transmitted a plurality of arrays of sonar beams 312, then it may receive a plurality of arrays of sonar beam 312 reflections. In response, the frequency steered sonar element 300 may generate a plurality of receive electronic signals, each receive electronic signal including a plurality of frequency components. In the exemplary embodiment of FIG. 20, the frequency steered sonar element 300 may generate three receive electronic signals, each receive electronic signal including four frequency components $f_1$-$f_4$. The receive electronic signals may be communicated to the marine display device 100.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A frequency steered sonar element comprising:
a transducer element presenting a longitudinal axis, the transducer element configured to receive a transmit electronic signal and generate an acoustic wave with a frequency component corresponding to a frequency component of the transmit electronic signal, the transmit electronic signal having one of a plurality of frequency components over a period of time; and
a grating element presenting a longitudinal axis, the grating element oriented such that the longitudinal axis of the grating element and the longitudinal axis of the transducer element form an acute angle, the grating element including a first surface and an opposing second surface, at least one of the surfaces including one or more grooves distributed thereon, the grating element configured to receive the acoustic wave and emit a sonar beam in one of a plurality of angular directions;
wherein the angular direction of the sonar beam corresponds to the frequency component of the acoustic wave over the period of time; and
wherein a sonar wedge is formed by each angular direction of the sonar beam.

2. The frequency steered sonar element of claim 1, further comprising a housing with spaced-apart first and second walls between which the transducer element and the grating element are positioned, with at least a portion of the space between the first and second walls is filled with a solid or fluid filler material.

3. The frequency steered sonar element of claim 1, wherein the grating element is further configured to receive reflections of the sonar beam and the transducer element is further configured to generate a receive electronic signal with a frequency component that indicates the angular direction from which the reflections were received.

4. The frequency steered sonar element of claim 1, wherein the transducer element is spaced apart from the grating element and faces the first surface of the grating element.

5. The frequency steered sonar element of claim 1, wherein the one or more grooves has a periodic profile.

6. The frequency steered sonar element of claim 1, wherein the one or more grooves includes first and second facets, at least one of the first or second facets is oriented at an acute angle with respect to the second surface and each groove has a sawtooth profile.

7. The frequency steered sonar element of claim 2, wherein the grating element is positioned such that the one or more grooves are accessible between lower surfaces of the first and second walls.

8. The frequency steered sonar element of claim 7, wherein the grating element is configured to transmit the acoustic wave of the transducer element as the sonar beam.

9. The frequency steered sonar element of claim 2, wherein the grating element is positioned such that the one or more grooves are accessible between side surfaces of the first and second walls.

10. The frequency steered sonar element of claim 9, wherein the grating element is configured to reflect the acoustic wave of the transducer element as the sonar beam.

11. The frequency steered sonar element of claim 1, wherein the transducer element is formed from piezoelectric material and the grating element is formed from silicone rubber.

12. A frequency steered sonar element comprising:
a housing including first and second spaced apart walls;
a transducer element presenting a longitudinal axis, the transducer element configured to receive a transmit electronic signal and generate an acoustic wave with a frequency component corresponding to a frequency component of the transmit electronic signal, the transmit electronic signal having one of a plurality of frequency components over a period of time; and
a grating element presenting a longitudinal axis, the grating element oriented such that a longitudinal axis of the grating element and a longitudinal axis of the transducer element form an acute angle, the grating element including a first surface and an opposing second surface, at least one of the surfaces including one or more grooves distributed thereon, the grating element configured to receive the acoustic wave and transmit the acoustic wave as a sonar beam in one of a plurality of angular directions;

wherein an angular direction of the sonar beam corresponds to the frequency component of the acoustic wave over the period of time; and
wherein a sonar wedge is formed by each angular direction of the sonar beam.

13. The frequency steered sonar element of claim 12, wherein the one or more grooves includes first and second facets, at least one of the first or second facets is oriented at an acute angle with respect to the second surface and the one or more grooves has a sawtooth profile.

14. The frequency steered sonar element of claim 12, wherein the grating element is further configured to receive reflections of the sonar beam and the transducer element is further configured to generate a receive electronic signal with a frequency component that indicates the angular direction from which the reflections were received.

15. The frequency steered sonar element of claim 12, wherein the transducer element is formed from piezoelectric material and the grating element is formed from silicone rubber.

16. A frequency steered sonar element comprising:
a housing including a plurality of spaced apart walls;
a plurality of sonar beam formers, each sonar beam former positioned between adjacent pairs of walls and having a unique orientation within the housing, each sonar beam former comprising—
 a transducer element presenting a longitudinal axis, the transducer element configured to receive a transmit electronic signal and generate an acoustic wave with a frequency component corresponding to a frequency component of the transmit electronic signal, the transmit electronic signal having one of a plurality of frequency components over a period of time, and
 a grating element associated with the transducer element and presenting a longitudinal axis, the grating element oriented such that a longitudinal axis of the grating element and a longitudinal axis of the transducer element form an acute angle, the grating element including a first surface and an opposing second surface, at least one of the surfaces including one or more grooves distributed thereon, the grating element configured to receive the acoustic wave from the associated transducer element and emit a sonar beam in one of a plurality of angular direction;
 wherein the angular direction of the sonar beam corresponds to the frequency component of the acoustic wave and the orientation of the transducer element and the grating element over the period of time; and
 wherein a sonar wedge is formed by each angular direction of the sonar beam.

17. The frequency steered sonar element of claim 16, wherein each grating element is further configured to receive reflections of its previously generated sonar beam and the associated transducer element is further configured to generate a receive electronic signal with a frequency component that indicates the angular direction from which the reflections were received.

18. The frequency steered sonar element of claim 16, wherein each grating element has a length that is greater than a length of the associated transducer element.

19. The frequency steered sonar element of claim 16, wherein the one or more groove of each grating element includes first and second facets, at least one of the first or second facets is oriented at an acute angle with respect to the second surface and each groove has a sawtooth profile.

20. The frequency steered sonar element of claim 16, wherein all of the transducer elements receive the same transmit electronic signal.

21. The frequency steered sonar element of claim 1, wherein the grating element has a length that is greater than a length of the transducer element.

22. The frequency steered sonar element of claim 1, wherein the plurality of frequency components of the transmit electronic signal are sequentially spaced apart in time.

23. The frequency steered sonar element of claim 22, wherein the angular directions in which the sonar beams are sequentially emitted to form the sonar wedge are adjacent to one another.

24. The frequency steered sonar element of claim 23, wherein the sonar wedge has an angular size of 40 degrees.

25. The frequency steered sonar element of claim 12, wherein the grating element has a length that is greater than a length of the transducer element.

26. The frequency steered sonar element of claim 12, wherein the plurality of frequency components of the transmit electronic signal are sequentially spaced apart in time.

* * * * *